(12) United States Patent
Matsushima

(10) Patent No.: US 7,822,864 B2
(45) Date of Patent: Oct. 26, 2010

(54) COMMUNICATION APPARATUS, PROGRAM PRODUCT FOR ADDING COMMUNICATION MECHANISM TO COMMUNICATION APPARATUS FOR PROVIDING IMPROVED USABILITY AND COMMUNICATION EFFICIENCY, AND RECORDING MEDIUM STORING PROGRAM PRODUCT

(75) Inventor: Hiroyuki Matsushima, Kanagawa-ken (JP)

(73) Assignee: Ricoh Co., Ltd., Tokyo (JP)

( * ) Notice: Subject to any disclaimer, the term of this patent is extended or adjusted under 35 U.S.C. 154(b) by 602 days.

(21) Appl. No.: 11/400,227

(22) Filed: Apr. 10, 2006

(65) Prior Publication Data

US 2006/0230152 A1 Oct. 12, 2006

(30) Foreign Application Priority Data

Apr. 8, 2005 (JP) ............................. 2005-112779

(51) Int. Cl.
*G06F 15/16* (2006.01)
(52) U.S. Cl. .................................................. 709/229
(58) Field of Classification Search ....................... None
See application file for complete search history.

(56) References Cited

U.S. PATENT DOCUMENTS

| | | | | |
|---|---|---|---|---|
| 6,012,083 A * | 1/2000 | Savitzky et al. | ............. | 709/202 |
| 2002/0055977 A1 | 5/2002 | Nishi | | |
| 2004/0148328 A1* | 7/2004 | Matsushima | ................ | 709/200 |
| 2004/0148335 A1* | 7/2004 | Keeney et al. | ............... | 709/201 |
| 2005/0027871 A1* | 2/2005 | Bradley et al. | ............... | 709/227 |
| 2007/0083425 A1* | 4/2007 | Cousineau et al. | ............. | 705/14 |

FOREIGN PATENT DOCUMENTS

| | | | |
|---|---|---|---|
| EP | 1 255 395 B1 | 11/2002 | |
| EP | 1 418 732 A2 | 5/2004 | |
| JP | 2001-273211 | 10/2001 | |
| JP | 2002-135858 | 5/2002 | |

(Continued)

OTHER PUBLICATIONS

A. Tanenbaum, "Modern Operating Systems", 2001 Prentice-Hall, Inc., XP-002404375, pp. 7-8.

(Continued)

*Primary Examiner*—Ario Etienne
*Assistant Examiner*—Clayton R Williams
(74) *Attorney, Agent, or Firm*—Oblon, Spivak, McClelland, Maier & Neustadt, L.L.P.

(57) ABSTRACT

A computer program product for, when run on a computer for controlling a second communication apparatus installed inside a firewall including a plurality of service providing mechanisms for receiving a communication request including an operation request from an apparatus installed inside the firewall, and sending a communication response including an operation response to the apparatus, performs a communication function addition method, including the steps of providing the computer with an intermediate mechanism for intermediating communication between a first communication apparatus installed outside the firewall and the plurality of service providing mechanisms, and causing the second communication apparatus to collectively receive and send operation requests to the service providing mechanisms and operation responses, respectively, from and to the first communication apparatus. A computer readable storage medium stores the computer program product. A communication apparatus installed inside the firewall including the plurality of service providing mechanisms is provided with the intermediate mechanism.

13 Claims, 23 Drawing Sheets

FOREIGN PATENT DOCUMENTS

| | | |
|---|---|---|
| JP | 2004-135323 | 4/2004 |
| JP | 2004-139586 | 5/2004 |
| JP | 2004-140818 | 5/2004 |
| JP | 2005-316991 | 11/2005 |

OTHER PUBLICATIONS

U.S. Appl. No. 11/198,911, filed Aug. 8, 2005.
U.S. Appl. No. 11/197,547, filed Aug. 5, 2005, Matsushima.
U.S. Appl. No. 12/051,226, filed Mar. 19, 2008, Matsushima.

* cited by examiner

FIG. 7

COMMAND SHEET IN SERVER

COMMAND ID
METHOD NAME
INPUT PARAMETER ( XML CHARACTER STRING )
STATUS ( INITIAL VALUE: TO BE PROCESSED )
OUTPUT PARAMETER ( XML CHARACTER STRING: EMPTY
　　　　　　　　　　　UNTIL PROCESS IS COMPLETED )
COMMAND DESTINATION ( COMMAND TRANSFER HANDLER )

FIG. 8

HTTP REQUEST

```
POST /aaa HTTP/1.1
Content-Type: multipart/mixed; boundary=MIME_boundary
Content-Length: nnnn --MIME_boundary
Content-Type: text/xml; charset=UTF-8
Content-Transfer-Encoding: 8bit
X-SOAP-Type: Response <s:Envelope>
   <--SOAP Response-->
</s:Envelope>
```
} FIRST PART

```
--MIME_boundary
Content-Type: text/xml; charset=UTF-8
Content-Transfer-Encoding: 8bit
X-SOAP-Type: Response <s:Envelope>
   <--SOAP Response-->
</s:Envelope>
```
} SECOND PART

```
--MIME_boundary
Content-Type: text/xml; charset=UTF-8
Content-Transfer-Encoding: 8bit
X-SOAP-Type: Response <s:Envelope>
   <--SOAP Response-->
</s:Envelope>
```
} THIRD PART

```
--MIME_boundary
Content-Type: text/xml; charset=UTF-8
Content-Transfer-Encoding: 8bit
X-SOAP-Type: Response <s:Envelope>
   <--SOAP Response-->
</s:Envelope>

--MIME_boundary--
```
} FOURTH PART

FIG. 9

HTTP RESPONSE

```
HTTP/1.1 200 OK
Content-Type: multipart/mixed; boundary=MIME_boundary
Content-Length: nnnn --MIME_boundary
Content-Type: text/xml; charset=UTF-8
Content-Transfer-Encoding: 8bit
X-SOAP-Type: Request
SOAPAction:"SOAP Action URI"

<s:Envelope>
   <--SOAP Request-->
</s:Envelope>

--MIME_boundary
Content-Type: text/xml; charset=UTF-8
Content-Transfer-Encoding: 8bit
X-SOAP-Type: Request
SOAPAction:"SOAP Action URI"

<s:Envelope>
   <--SOAP Request-->
</s:Envelope>

--MIME_boundary
Content-Type: text/xml; charset=UTF-8
Content-Transfer-Encoding: 8bit
X-SOAP-Type: Request
SOAPAction:"SOAP Action URI"

<s:Envelope>
   <--SOAP Request-->
</s:Envelope>

--MIME_boundary
Content-Type: text/xml; charset=UTF-8
Content-Transfer-Encoding: 8bit
X-SOAP-Type: Request
SOAPAction:"SOAP Action URI"

<s:Envelope>
   <--SOAP Request-->
</s:Envelope>

--MIME_boundary--
```

- FIRST PART (first MIME section)
- SECOND PART (second MIME section)
- THIRD PART (third MIME section)
- FOURTH PART (fourth MIME section)

FIG. 10
EXAMPLE OF COMMAND PART ( USER REGISTRATION )

```
Content-Type: text/xml; charset=UTF-8
Content-Transfer-Encoding: 8bit
X-SOAP-Type: Request
SOAPAction:"http://www.example.com/useradmin/resister"

<s:Envelope
    xmlns:s="http://schemas.xmlsoap.org/soap/envelope/"
    xmlns:se="http://schemas.xmlsoap.org/soap/encoding/"
    xmlns:n="http://www.example.com/header"
    xmlns:nc="http://www.example.com/useradmin"
    s:encodingStyle="http://schemas.xmlsoap.org/soap/encoding">

<s:Header>
    <n:REQUEST_ID>98765</n:REQUEST_ID>
  </s:Header>
  <s:Body>
    <nc:USER_REGISTRATION>
      <USER_NAME>RICOH</USER_NAME>
      <PASSWORD>XXXXX</PASSWORD>
    </nc:USER_REGISTRATION>
  </s:Body>
</s:Envelope>
```

FIG. 11
EXAMPLE OF COMMAND RESPONSE PART ( USER REGISTRATION )

```
Content-Type: text/xml; charset=UTF-8
Content-Transfer-Encoding: 8bit
X-SOAP-Type: Response <s:Envelope
    xmlns:s="http://schemas.xmlsoap.org/soap/envelope/"
    xmlns:se="http://schemas.xmlsoap.org/soap/encoding/"
    xmlns:n="http://www.example.com/header"
    xmlns:nc="http://www.example.com/useradmin"
    s:encodingStyle="http://schemas.xmlsoap.org/soap/encoding">

<s:Header>
    <n:REQUEST_ID>98765</n:REQUEST_ID>
  </s:Header>
  <s:Body>
    <nc:USER_REGISTRATION Response>
      <RESULT>OK</RESULT>
    </nc:USER_REGISTRATION Response>
  </s:Body>
</s:Envelope>
```

| ITEM | CONTENTS |
|---|---|
| COMMAND ID | EXTRACTED FROM A SOAP HEADER |
| METHOD NAME | EXTRACTED FROM A SOAP BODY |
| INPUT PARAMETER | AN XML CHARACTER STRING IN A SOAP ENVELOP DIRECTLY REGISTERED |
| STATUS | "TO BE PROCESSED" |
| ( COMMAND DESTINATION ) | "COMMAND TRANSFER HANDLER" |
| OUTPUT PARAMETER | -EMPTY- |

| NAMESPACE URI | PORT | URL PATH |
|---|---|---|
| http://www.example.com/useradmin/ | 80 | /useradmin |
| http://www.example.com/docadmin/ | 8080 | /docadmin |
| ⋮ | ⋮ | ⋮ |

COMMAND SHEET IN EXTERNAL APPARATUS

COMMAND ID
METHOD NAME (E.G. USER_REGISTRATION)
INPUT PARAMETER
STATUS (INITIAL VALUE: TO BE PROCESSED)
OUTPUT PARAMETER (EMPTY UNTIL RESPONSE IS OBTAINED)
COMMAND EXECUTION RESULT DESTINATION

FIG. 21

```
Content-Type: text/xml; charset=UTF-8
Content-Transfer-Encoding: 8bit
X-SOAP-Type: Request
SOAPAction:"http://www.example.com/useradmin/resister"
X-SOAP-Forward-URL: "http://127.0.0.1:80/useradmin"

<s:Envelope
    xmlns:s="http://schemas.xmlsoap.org/soap/envelope/"
    xmlns:se="http://schemas.xmlsoap.org/soap/encoding/"
    xmlns:n="http://www.example.com/header"
    xmlns:nc="http://www.example.com/useradmin"
    s:encodingStyle="http://schemas.xmlsoap.org/soap/encoding">

<s:Header>
    <n:REQUEST_ID>98765</n:REQUEST_ID>
  </s:Header>
  <s:Body>
    <nc:USER_REGISTRATION>
      <USER_NAME>RICOH</USER_NAME>
      <PASSWORD>XXX</PASSWORD>
    </nc:USER_REGISTRATION>
  </s:Body>
</s:Envelope>
```

FIG. 22

```
Content-Type: text/xml; charset=UTF-8
Content-Transfer-Encoding: 8bit
X-SOAP-Type: Request
SOAPAction:"http://www.example.com/useradmin/resister"

<s:Envelope
    xmlns:s="http://schemas.xmlsoap.org/soap/envelope/"
    xmlns:se="http://schemas.xmlsoap.org/soap/encoding/"
    xmlns:n="http://www.example.com/header"
    xmlns:nc="http://www.example.com/useradmin"
    s:encodingStyle="http://schemas.xmlsoap.org/soap/encoding">

<s:Header>
    <n:REQUEST_ID>98765</n:REQUEST_ID>
    <n:DESTINATION_URL>http://127.0.0.1:80/useradmin
    </n:DESTINATION_URL>
  </s:Header>
  <s:Body>
    <nc:USER_REGISTRATION>
      <USER_NAME>RICOH</USER_NAME>
      <PASSWORD>XXX</PASSWORD>
    </nc:USER_REGISTRATION>
  </s:Body>
</s:Envelope>
```

FIG. 23
EXAMPLE OF COMMAND PART ( USER DELETION )

```
Content-Type: text/xml; charset=UTF-8
Content-Transfer-Encoding: 8bit
X-SOAP-Type: Request
SOAPAction:"http://www.example.com/useradmin/scratch"

<s:Envelope···>

<s:Header>
   <n:REQUEST_ID>98766</n:REQUEST_ID>
 </s:Header>
 <s:Body>
   <nc:USER_DELETION>
     <USER_NAME>RICOH</USER_NAME>
   </nc:USER_DELETION>
 </s:Body>
</s:Envelope>
```

FIG. 24
EXAMPLE OF COMMAND RESPONSE PART ( USER DELETION )

```
Content-Type: text/xml; charset=UTF-8
Content-Transfer-Encoding: 8bit
X-SOAP-Type: Response <s:Envelope···>

<s:Header>
   <n:REQUEST_ID>98766</n:REQUEST_ID>
 </s:Header>
 <s:Body>
   <nc:USER_DELETION Response>
     <RESULT>OK</RESULT>
   </nc:USER_DELETION Response>
 </s:Body>
</s:Envelope>
```

FIG. 25

EXAMPLE OF COMMAND PART ( USER LIST ACQUISITION )

```
Content-Type: text/xml; charset=UTF-8
Content-Transfer-Encoding: 8bit
X-SOAP-Type: Request
SOAPAction:"http://www.example.com/useradmin/getuserlist"

<s:Envelope···>

<s:Header>
   <n:REQUEST_ID>98767</n:REQUEST_ID>
 </s:Header>
 <s:Body>
   <nc:USER_LIST_ACQUISITION/>
 </s:Body>
</s:Envelope>
```

FIG. 26

EXAMPLE OF COMMAND RESPONSE PART ( USER LIST ACQUISITION )

```
Content-Type: text/xml; charset=UTF-8
Content-Transfer-Encoding: 8bit
X-SOAP-Type: Response <s:Envelope···>

<s:Header>
   <n:REQUEST_ID>98767</n:REQUEST_ID>
 </s:Header>
 <s:Body>
   <nc:USER_LIST_ACQUISITION Response>
    <USER_LIST>
     <USER_NAME>RICOH</USER_NAME>
     <USER_NAME>TEST</USER_NAME>
         ·
         ·
         ·
    </USER_LIST>
   </nc:USER_LIST_ACQUISITION Response>
 </s:Body>
</s:Envelope>
```

FIG. 27
EXAMPLE OF COMMAND PART ( DOCUMENT LIST ACQUISITION )

```
Content-Type: text/xml; charset=UTF-8
Content-Transfer-Encoding: 8bit
X-SOAP-Type: Request
SOAPAction:"http://www.example.com/docadmin/getdocumentlist"

<s:Envelope
    xmlns:s="http://schemas.xmlsoap.org/soap/envelope/"
    xmlns:se="http://schemas.xmlsoap.org/soap/encoding/"
    xmlns:n="http://www.example.com/header"
    xmlns:nc="http://www.example.com/docadmin"
    s:encodingStyle="http://schemas.xmlsoap.org/soap/encoding">

<s:Header>
    <n:REQUEST_ID>98768</n:REQUEST_ID>
  </s:Header>
  <s:Body>
    <nc: DOCUMENT_LIST_ACQUISITION/>
  </s:Body>
</s:Envelope>
```

FIG. 28
EXAMPLE OF COMMAND RESPONSE PART ( DOCUMENT LIST ACQUISITION )

```
Content-Type: text/xml; charset=UTF-8
Content-Transfer-Encoding: 8bit
X-SOAP-Type: Response <s:Envelope...>

<s:Header>
    <n:REQUEST_ID>98768</n:REQUEST_ID>
  </s:Header>
  <s:Body>
    <nc:DOCUMENT_LIST_ACQUISITION Response>
      <DOCUMENT_LIST>
        <DOCUMENT_ID>1234567</DOCUMENT_ID>
        <DOCUMENT_ID>9999999</DOCUMENT_ID>
            .
            .
            .
      </DOCUMENT_LIST>
    </nc:DOCUMENT_LIST_ACQUISITION Response>
  </s:Body>
</s:Envelope>
```

FIG. 29
EXAMPLE OF COMMAND PART ( DOCUMENT IMAGE ACQUISITION )

```
Content-Type: text/xml; charset=UTF-8
Content-Transfer-Encoding: 8bit
X-SOAP-Type: Request
SOAPAction:"http://www.example.com/docadmin/getimagedata"

<s:Envelope···>

<s:Header>
    <n:REQUEST_ID>98769</n:REQUEST_ID>
  </s:Header>
  <s:Body>
    <nc:DOCUMENT_IMAGE_ACQUISITION>
      <DOCUMENT_ID>1234567</DOCUMENT_ID>
    </nc:DOCUMENT_IMAGE_ACQUISITION>
  </s:Body>
</s:Envelope>
```

FIG. 30
EXAMPLE OF COMMAND RESPONSE PART
( DOCUMENT IMAGE ACQUISITION )

```
Content-Type: text/xml; charset=UTF-8
Content-Transfer-Encoding: 8bit
X-SOAP-Type: Response <s:Envelope···>

<s:Header>
    <n:REQUEST_ID>98769</n:REQUEST_ID>
  </s:Header>
  <s:Body>
    <nc:DOCUMENT_IMAGE_ACQUISITION Response>
      <DOCUMENT_IMAGE_DATA>
        LGJLKEJRQPOIUOIJL+KJLAK
        AJSLAFHKJEHLFKJHQEKLJHL
             ·
             ·
             ·
      </DOCUMENT_IMAGE_DATA>
    </nc:DOCUMENT_IMAGE_ACQUISITION Response>
  </s:Body>
</s:Envelope>
```

FIG. 31
EXAMPLE OF COMMAND PART ( DOCUMENT DELETION )

```
Content-Type: text/xml; charset=UTF-8
Content-Transfer-Encoding: 8bit
X-SOAP-Type: Request
SOAPAction:"http://www.example.com/docadmin/delete"

<s:Envelope···>

<s:Header>
    <n:REQUEST_ID>98770</n:REQUEST_ID>
  </s:Header>
  <s:Body>
    <nc: DOCUMENT_DELETION>
      <DOCUMENT_ID>1234567</DOCUMENT_ID>
    </nc:DOCUMENT_DELETION>
  </s:Body>
</s:Envelope>
```

FIG. 32
EXAMPLE OF COMMAND RESPONSE PART ( DOCUMENT DELETION )

```
Content-Type: text/xml; charset=UTF-8
Content-Transfer-Encoding: 8bit
X-SOAP-Type: Response <s:Envelope···>

<s:Header>
    <n:REQUEST_ID>98770</n:REQUEST_ID>
  </s:Header>
  <s:Body>
    <nc:DOCUMENT_DELETION Response>
      <RESULT>OK</RESULT>
    </nc:DOCUMENT_DELETION Response>
  </s:Body>
</s:Envelope>
```

FIG. 33
(a)
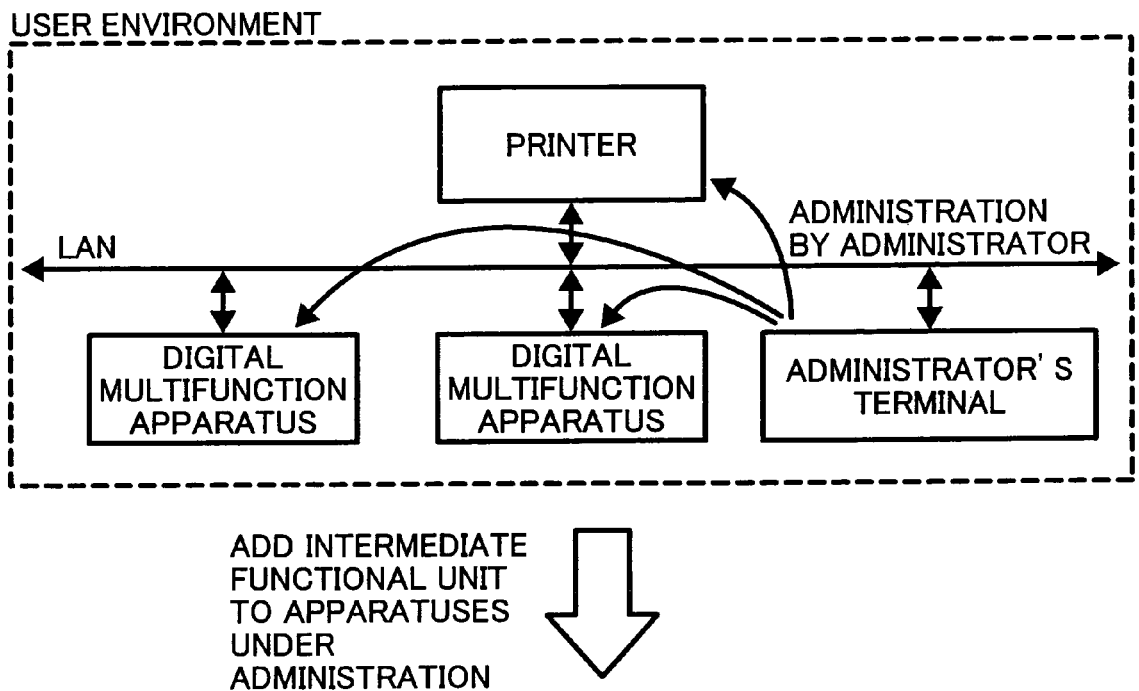
ADD INTERMEDIATE
FUNCTIONAL UNIT
TO APPARATUSES
UNDER
ADMINISTRATION
(b)
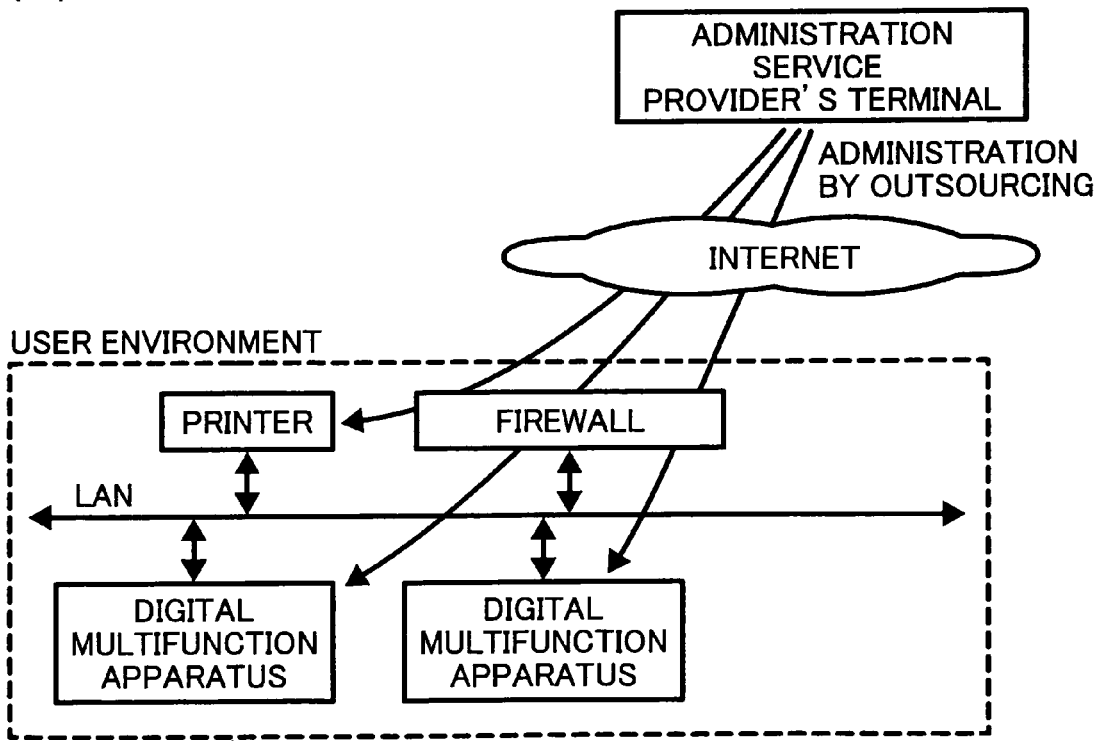

FIG. 34
(a)
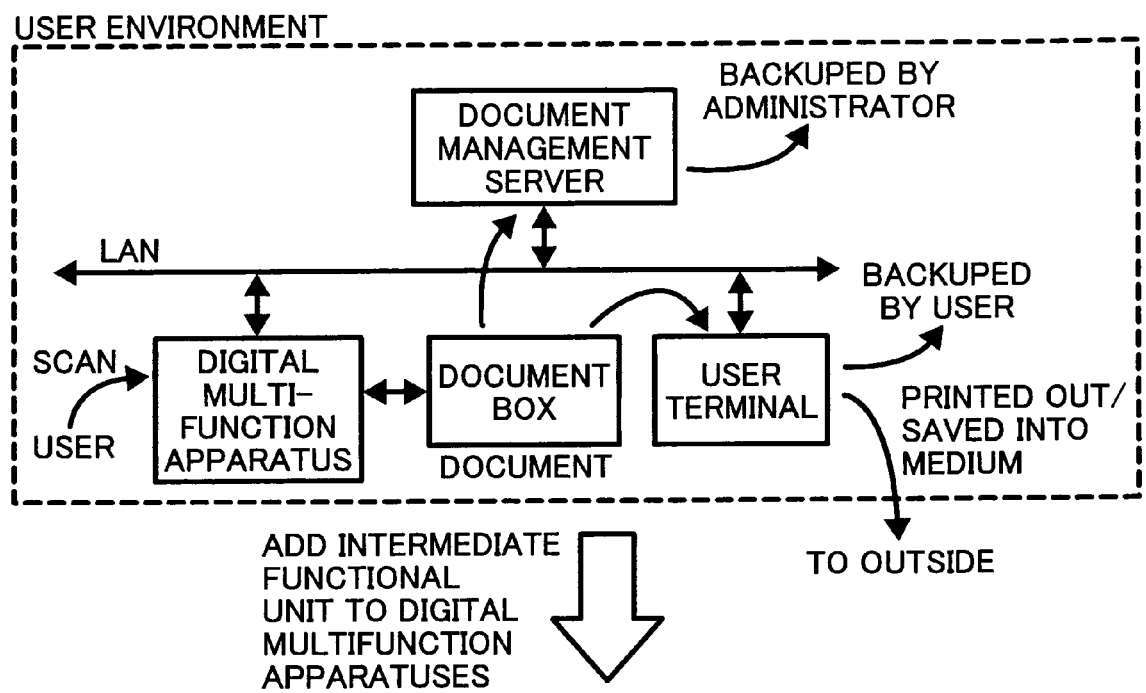
(b)
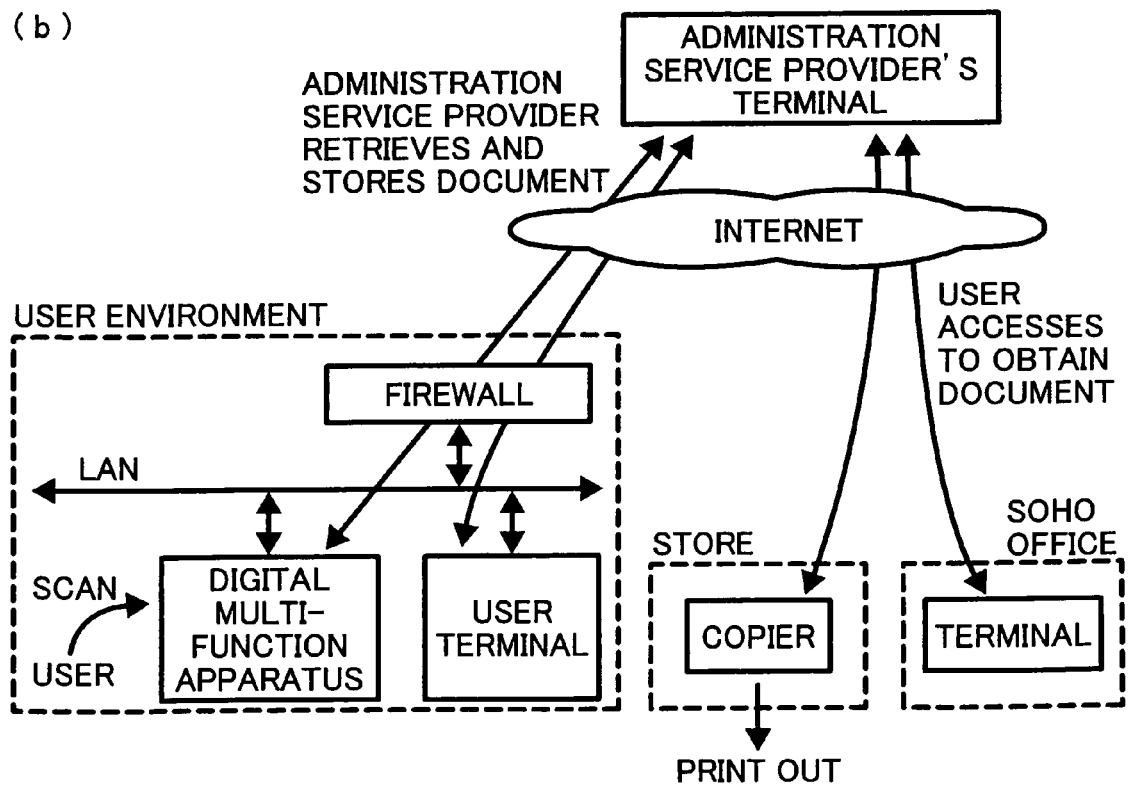

COMMUNICATION APPARATUS, PROGRAM PRODUCT FOR ADDING COMMUNICATION MECHANISM TO COMMUNICATION APPARATUS FOR PROVIDING IMPROVED USABILITY AND COMMUNICATION EFFICIENCY, AND RECORDING MEDIUM STORING PROGRAM PRODUCT

BACKGROUND OF THE INVENTION

1. Field of the Invention

The present invention relates to a communication apparatus, a program product, and a recording medium storing the program product, and more particularly to a communication apparatus including a plurality of service providing functions, a program product for adding a new communication mechanism to the communication apparatus for providing improved usability and communication efficiency, and a recording medium storing the program product.

2. Discussion of the Background

In a background communication apparatus, an application program executed by the communication apparatus is provided with a method. The background communication apparatus receives a request for processing the method as a command from an external apparatus, and returns a result of the processing as a response. The method refers to a logical function for which formats of an input and an output are defined. In the case, the command represents a Procedure Call for calling the function, while the response represents a result of execution of the function called by the Procedure Call.

In detail, the above processing can be performed by a service function, for example a web service providing function, for receiving a command as a simple object access protocol (SOAP) request included in a hypertext transfer protocol (HTTP) request, and for sending a SOAP response to the SOAP request included in an HTTP response.

The service function is also used by a client machine such as a personal computer by sending a command to the communication apparatus as a SOAP request included in an HTTP request, and by receiving a SOAP response representing a result of execution of the command included in an HTTP response.

There is no problem for the communication apparatus to provide the above service when a firewall is not installed between the communication apparatus and a service receiving apparatus (user apparatus), for example, when the communication apparatus can communicate with the service receiving apparatus through a network within a user environment such as a local area network (LAN). Generally, in the case, the network is configured such that any apparatus can send and receive a communication request such as an HTTP request to any apparatus, and therefore, a service receiving apparatus can freely send a communication request to a service providing apparatus.

However, when the firewall is installed, and a service receiving apparatus, for example, needs to communicate with a service providing apparatus installed in a LAN through the Internet, the service receiving apparatus cannot send a communication request. In general, because a firewall is install for a purpose of blocking access from outside to inside, when a service providing apparatus is installed inside the firewall, an apparatus installed outside the firewall cannot send a command (operation request) included in a communication request to the service providing apparatus.

In a known technique, when a local processor is arranged inside a firewall, the local processor sends an HTTP request to a remote processor arranged outside the firewall, and the remote processor sends a command to the local processor as a response to the HTTP request so that a command can be sent from outside the firewall to inside.

In another technique, reverse tunneling using a reverse proxy and a proxy agent is adopted so that a command and a response to the command can be transmitted through a firewall.

The above techniques related to command transmission have been applied to a system for remotely controlling operation of an apparatus connected to a communication apparatus. For example, the techniques are applied to a remote control system including a remote controlled apparatus and a remote control apparatus. The remote control apparatus receives an operation from a user, and sends a command to the remote controlled apparatus to cause the remote controlled apparatus to operate a window shade and a lighting apparatus.

SUMMARY OF THE INVENTION

This patent specification describes a computer program product stored in a computer readable storage medium for, when run on a computer for controlling a second communication apparatus installed inside a firewall including a plurality of service providing mechanisms each configured to receive a communication request including an operation request from an apparatus installed inside the firewall, and to send a communication response including an operation response to the operation request to the apparatus, carrying out a communication function addition method, including the steps of providing the computer with an intermediate mechanism configured to intermediate communication between a first communication apparatus installed outside the firewall and the plurality of service providing mechanisms, and causing the second communication apparatus to collectively receive a plurality of operation requests to the plurality of service providing mechanisms and collectively send a plurality of operation responses from and to the first communication apparatus. This patent specification further describes a computer readable storage medium storing a computer program product for, when run on a computer for controlling a second communication apparatus installed inside a firewall including a plurality of service providing mechanisms each configured to receive a communication request including an operation request from an apparatus installed inside the firewall, and to send a communication response including an operation response to the operation request to the apparatus, carrying out a communication function addition method, comprising the steps of providing the computer with an intermediate mechanism configured to intermediate communication between a first communication apparatus installed outside the firewall and the plurality of service providing mechanisms, and causing the second communication apparatus to collectively receive a plurality of operation requests to the plurality of service providing mechanisms and collectively send a plurality of operation responses from and to the first communication apparatus. This patent specification further describes a communication apparatus installed inside a firewall including a plurality of service providing mechanisms each configured to receive a communication request including an operation request from an apparatus installed inside the firewall, and to send a communication response including an operation response to the operation request to the apparatus, and an intermediate mechanism configured to intermediate communication between an external apparatus installed outside the firewall and the plurality of service providing mechanisms so that the communication apparatus may collectively receive a plurality of operation requests to the plurality of service providing mechanisms and collectively send a plurality of operation responses from and to the external apparatus.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein:

FIG. 7 is an illustration of a structure of data included in a command sheet in the server shown in FIG. 6;

FIG. 8 is an illustration of an HTTP request sent by the server to the external apparatus;

FIG. 9 is an illustration of an HTTP response received by the server from the external apparatus;

FIG. 10 is an illustration of a part of the HTTP response which includes a command to a web service function;

FIG. 11 is an illustration of a part including a response to the command shown in FIG. 10;

FIG. 13 is a table of data items to be written into respective fields of a command sheet and information of where the data items are obtained from;

FIG. 14 is a flowchart of a command transfer operation in the server;

FIG. 21 is an illustration of an example of a part of an HTTP response which includes a command to a web service function according to another embodiment of the present invention;

FIG. 22 is an illustration of another example of the part shown in FIG. 21;

FIG. 23 is an illustration of a part including a user deletion command;

FIG. 24 is an illustration of a part including a response to the user deletion command;

FIG. 25 is an illustration of a part including a user list acquisition command;

FIG. 26 is an illustration of a part including a response to the user list acquisition command;

FIG. 27 is an illustration of a part including a document list acquisition command;

FIG. 28 is an illustration of a part including a response to the document list acquisition command;

FIG. 29 is an illustration of a part including a document image acquisition command;

FIG. 30 is an illustration of a part including a response to the document image acquisition command;

FIG. 31 is an illustration of a part including a document deletion command;

FIG. 32 is an illustration of a part including a response to the document deletion command;

FIG. 33 is a schematic illustration for explaining an example to which the embodiments of the present invention are applied; and FIG. 34 is a schematic illustration for explaining another example to which the embodiments of the present invention are applied;

DETAILED DESCRIPTION OF PREFERRED EMBODIMENTS

Figure 1:
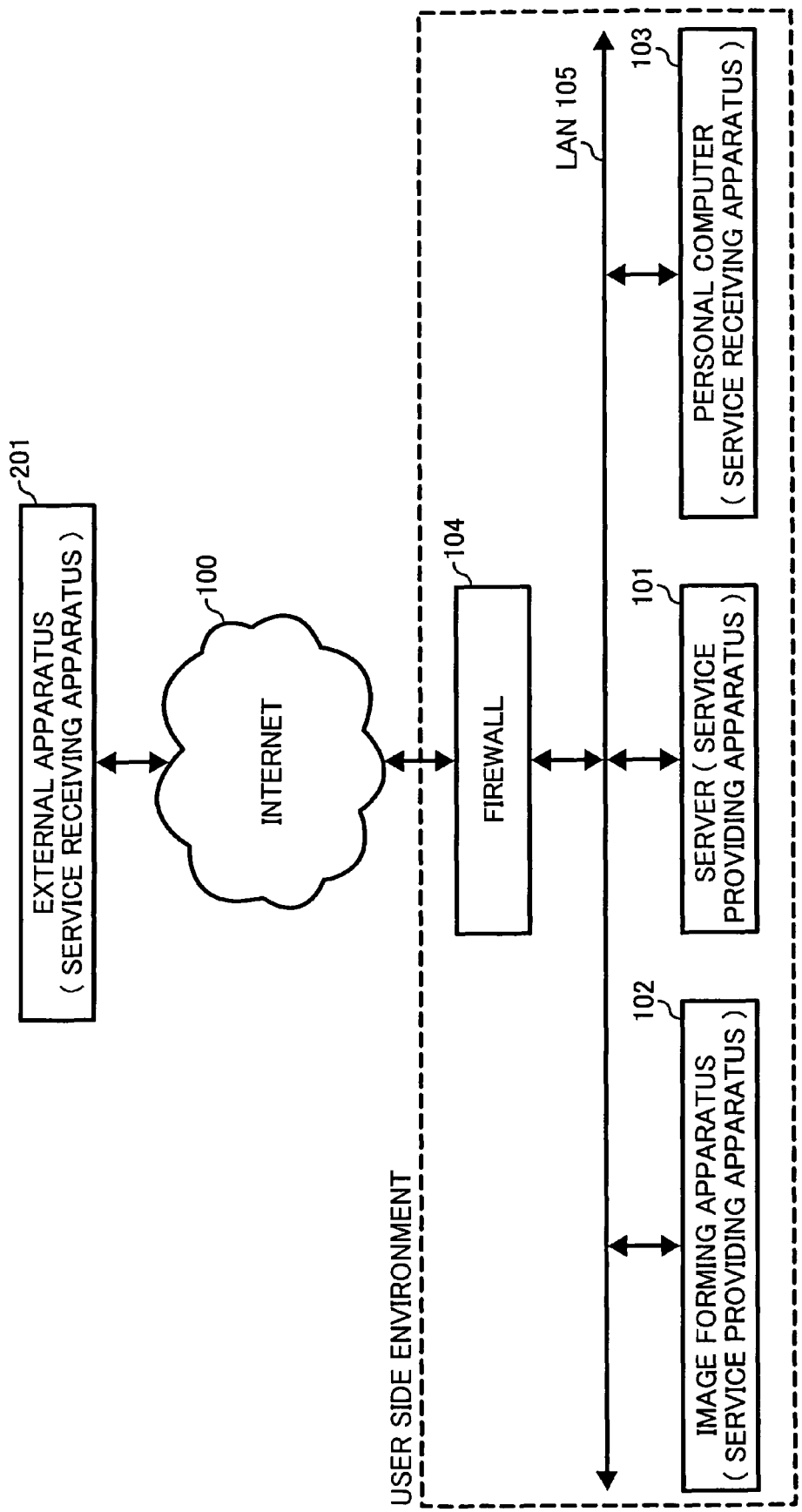
FIG. 1 is a schematic illustration of a configuration of a communication system including a communication apparatus according to an embodiment of the present invention.

In describing preferred embodiments illustrated in the drawings, specific terminology is employed for the sake of clarity. However, the disclosure of this patent specification is not intended to be limited to the specific terminology so selected and it is to be understood that each specific element includes all technical equivalents that operate in a similar manner. Referring now to the drawings, wherein like reference numerals designate identical or corresponding parts throughout the several views particularly to FIG. 1, a communication apparatus according to a preferred embodiment of the present invention is described.

As shown in FIG. 1, an exemplary configuration of a communication system includes an external apparatus 201 serving as a first communication apparatus, a server 101 and an image forming apparatus 102 serving as second communication apparatuses, and a personal computer 103. The server 101, the image forming apparatus 102, and the personal computer 103 are installed in a user side environment, and are connected via a local area network (hereinafter referred to as LAN) 105. For a security reason, the LAN 105 is connected to a firewall 104 so that the server 101, the image forming apparatus 102, and the personal computer 103 are connected to the Internet 100 via the firewall 104.

In the communication system, each of the server 101 and the image forming apparatus 102 has a function of receiving a communication request including an operation request, and sending back a communication response including an operation response to the operation request. By using the function, the server 101 and the image forming apparatus 102 can provide a service, such as a web service, of performing a requested operation and returning a result of the operation as an operation response to a communication apparatus (and of which user) in communication. The server 101 and the image forming apparatus 102 are referred to as service providing apparatuses since the server 101 and the image forming apparatus 102 include the function of providing the service. The operation request is sent by a service receiving apparatus. The service receiving apparatus sends the operation request and obtains the operation response representing the result of the requested operation so as to use the service. In another case, the service providing apparatus also serves as the service receiving apparatus.

An operation request corresponds to, for example, a request for processing a method of an application program executed by the service providing apparatus, where the method is a logical function defining input and output formats. In other words, an operation request represents a procedure call for calling the function, and an operation response represents a result of execution of the function called by the procedure call. An operation request may include a notification which does not accompany a meaningful execution result. The service receiving apparatus sends an operation request to the service providing apparatus to make a remote procedure call (hereinafter referred to as RPC).

In the embodiment of the present invention, a simple object access protocol (hereinafter referred to as SOAP) is adopted as a protocol for handling a parameter and a return value of the RPC. Therefore, the operation request and the operation response are written in a form of a SOAP message. Alternatively, other protocols such as a distributed component object model (DCOM) may be used.

Figure 2:
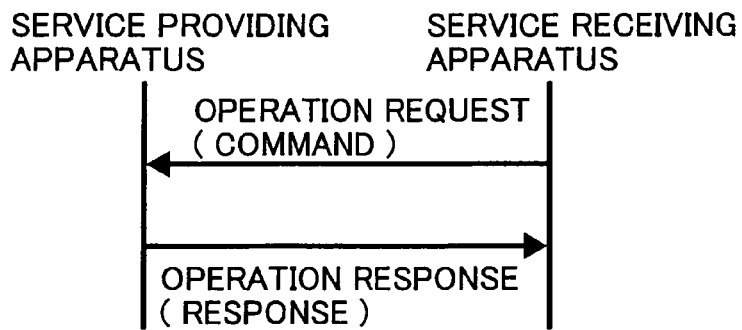
FIG. 2 is a diagram illustrating a relationship between an operation request and an operation response in the communication system shown in FIG. 1.

The operation request and the operation response have a relationship shown in FIG. 2, where presence of the firewall 104 is not taken into account.

As shown in FIG. 2, when the service receiving apparatus needs to use a service provided by the service providing apparatus, the service receiving apparatus generates an operation request and sends the operation request to the service providing apparatus. The service providing apparatus receives the operation request, and returns an operation response to the operation request.

A communication protocol for transferring one of an operation request and an operation response can be selected according to a system configuration. Examples of the communication protocol include a hypertext transfer protocol (HTTP) and a simple mail transfer protocol (SMTP). In the embodiment of the present invention, the HTTP is used as the communication protocol. Therefore, the service providing apparatus includes a function of receiving an HTTP request being a communication request including a SOAP request being an operation request, and sending an HTTP response being a communication response including a SOAP response being an operation response to the SOAP request.

Inside the firewall 104, a communication request such as an HTTP request can be freely sent from the service receiving apparatus such as the personal computer 103 to the service providing apparatus. However, as the firewall 104 is designed to block a communication request from outside the firewall 104, in general, the external apparatus 201 cannot send an operation request to the service providing apparatus inside the firewall 104 by just sending a communication request. Therefore, for the external apparatus 201 needs to adopt a special protocol to use a service provided by the service providing apparatus inside the firewall 104.

For the above reason, in the embodiment of the present invention, each of the server apparatus 101 and the image forming apparatus 102 serving as a communication apparatus including the function of providing the service is provided with an intermediate module for intermediating communication between the external apparatus 201 installed outside the firewall 104 and the service providing function of the server apparatus 101 and the image forming apparatus 102. The intermediate module causes the service providing apparatus to receive an operation request from the external apparatus 201 installed outside the firewall 104, and to send back a response to the operation request.

Further, in a case the service providing apparatus includes a plurality of service providing functions, and has a configuration such that the plurality of service providing functions receive respective operation requests at respective ports, the intermediate module causes the service providing apparatus to collectively receive the operation requests, and to collectively send responses to the operation requests.

When the intermediate module is used for communication with the service receiving apparatus, the service receiving apparatus needs to be provided with a function for performing communication using the intermediate module.

Figure 3:
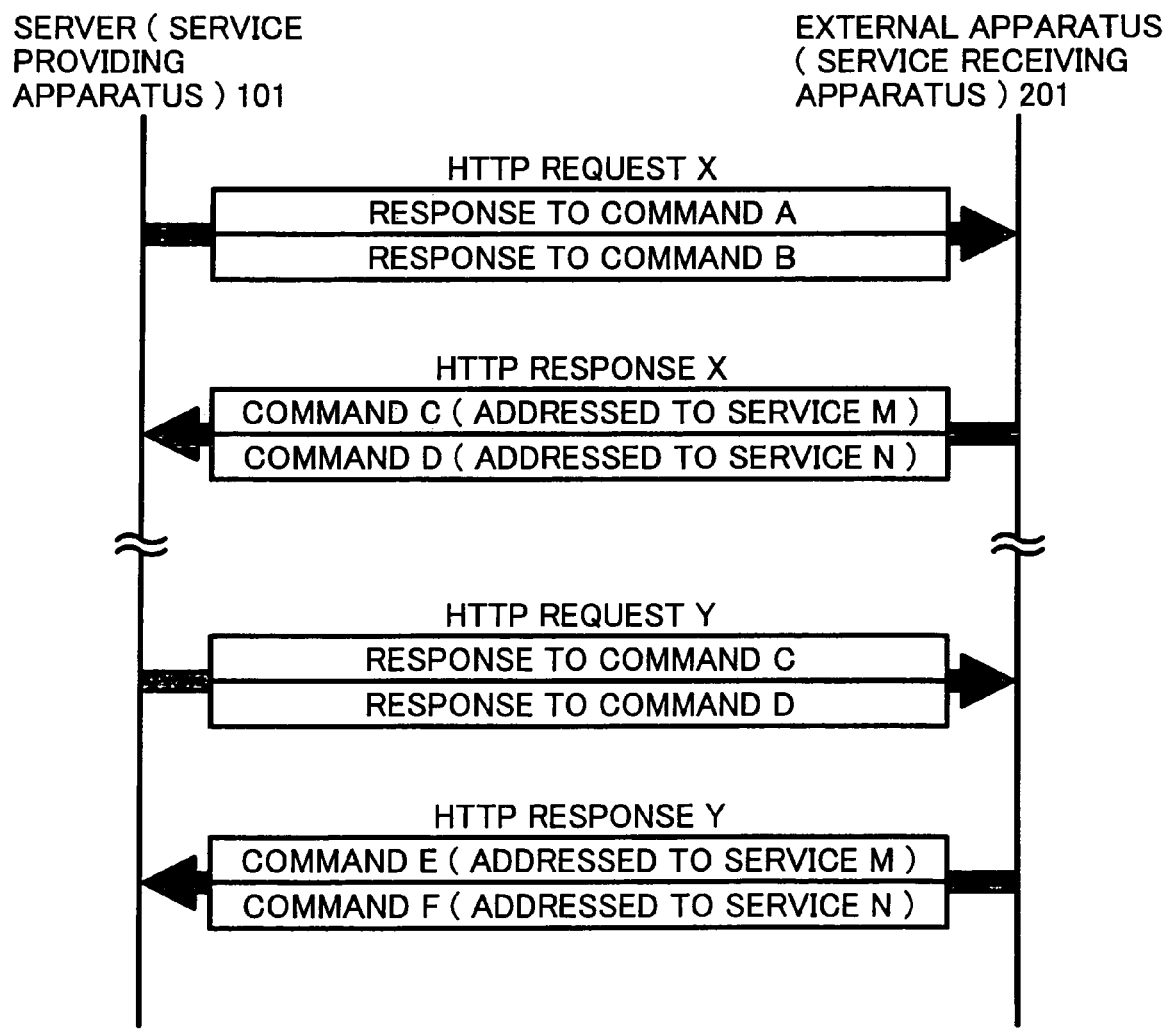
FIG. 3 is a diagram illustrating a communication sequence between a service providing apparatus and a service receiving apparatus using an intermediate module in the communication system.

The service providing apparatus and the service receiving apparatus communicate with each other by using an exemplary communication sequence shown in FIG. 3.

For convenience of explanation, hereinafter, the server 101 represents the service providing apparatus, and the external apparatus 201 represents the service receiving apparatus unless otherwise specified.

Hereinafter, an operation request is referred to as a command, and an operation response is referred to as a response (to a command) as necessary.

Although the firewall 104 is provided between the server 101 and the external apparatus 201, such a sequence shown in FIG. 3 that the server 101 sends an HTTP request for requesting communication to the external apparatus 201, and the external apparatus 201 sends back an HTTP response to the HTTP request to the server 101 causes the server 101 and the external apparatus 201 to communicate with each other. For example, the server 101 sends an HTTP request X to the external apparatus 201, and the external apparatus 201 sends back an HTTP response X as a response to the HTTP request X. Similarly, the server 101 sends an HTTP request Y to the external apparatus 201, and the external apparatus 201 sends back an HTTP response Y as a response to the HTTP request Y. When the server 101 and the external apparatus 201 communicate with each other using the intermediate module, the above communication sequence is always used.

Further, when the server 101 sends an HTTP request to the external apparatus 201, the server 101 puts a response to a command sent from the external apparatus 201 into the HTTP request. When the external apparatus 201 sends an HTTP response corresponding to the HTTP request to the server 101, the external apparatus 201 puts a command for using a service provided by the server 101 into the HTTP response.

Generally, therefore, the external apparatus 201 cannot send a command to the server 101 at a discretionary point in time. In other words, the external apparatus 201 can send a command to the server 101 only when the external apparatus 201 receives an HTTP request from the server 101. However, the server 101 can be configured to send an HTTP request to the external apparatus 201 at one of a regular point and a suitable point in time so that the external apparatus 201 can send a command to the server.

In the embodiment of the present invention, the number of commands that can be included in a single HTTP response is not limited, and the number may be zero. Logically, commands included in the single HTTP response are collectively transferred at one time, even when the commands are requests for such services that are generally handled at different URLs (for example, a service M and a service N). Similarly, the number of responses that can be included in a single HTTP request is not limited, and the number may be zero. Logically, responses included in the singe HTTP request are collectively transferred at one time, even when the responses are responses to requests for such services that are generally handled at different URLs.

Collectively transferring commands to and from different addresses and collectively transferring responses to and from different addresses reduce the number of connections needed for transferring necessary information, resulting in a reduction in overhead of communication and in efficient communication.

Figure 4:
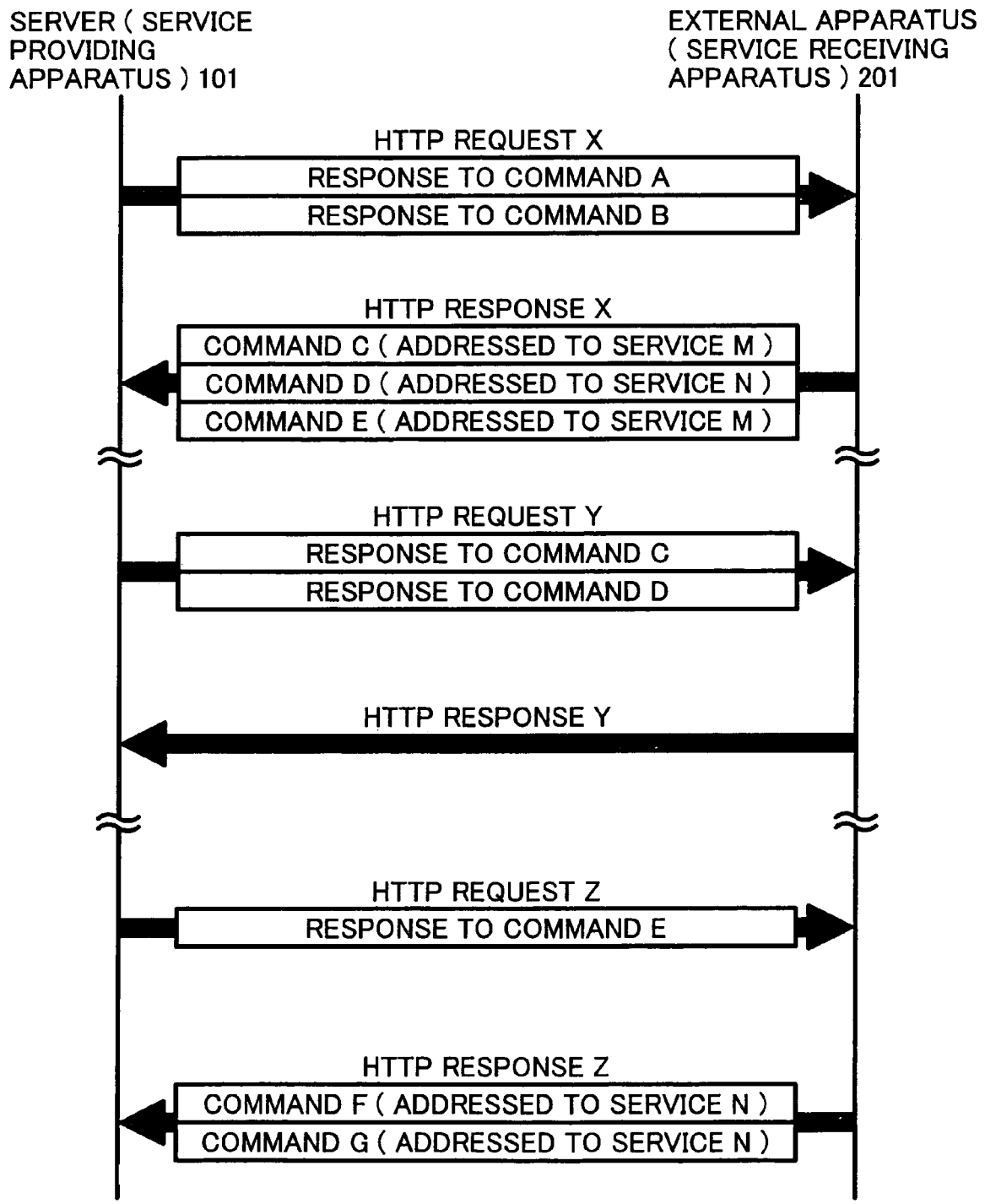
FIG. 4 is a diagram illustrating another communication sequence between the service providing apparatus and the service receiving apparatus using the intermediate module in the communication system.

The communication sequence shown in FIG. 3 is a simplified example for convenience of explanation. Another communication sequence is shown in FIG. 4 as an example in which the number of commands and the number of responses included in an HTTP response and an HTTP request, respectively, are not constant. When the server 101 sends an HTTP request after receiving an HTTP response including a plurality of commands, the server 101 does not necessarily put all responses to the plurality of commands into the HTTP request. As shown in FIG. 4, the server 101 may firstly send responses to commands of which operations have been finished first (the HTTP request Y), and then send responses to the remaining commands later (the HTTP request Z).

For the collective transferring of commands (responses) between the server 101 and the external apparatus 201, the commands (responses) need to be joined and separated before and after the transfer, as the commands (responses) are designed to be independently generated and processed. Further, when the server 101 receives a plurality of commands, the server 101 needs to transfer the plurality of commands to respective service functions. The joining, separation, and transferring are described below together with hardware configurations of the server 101 and the external apparatus 201.

Figure 5:
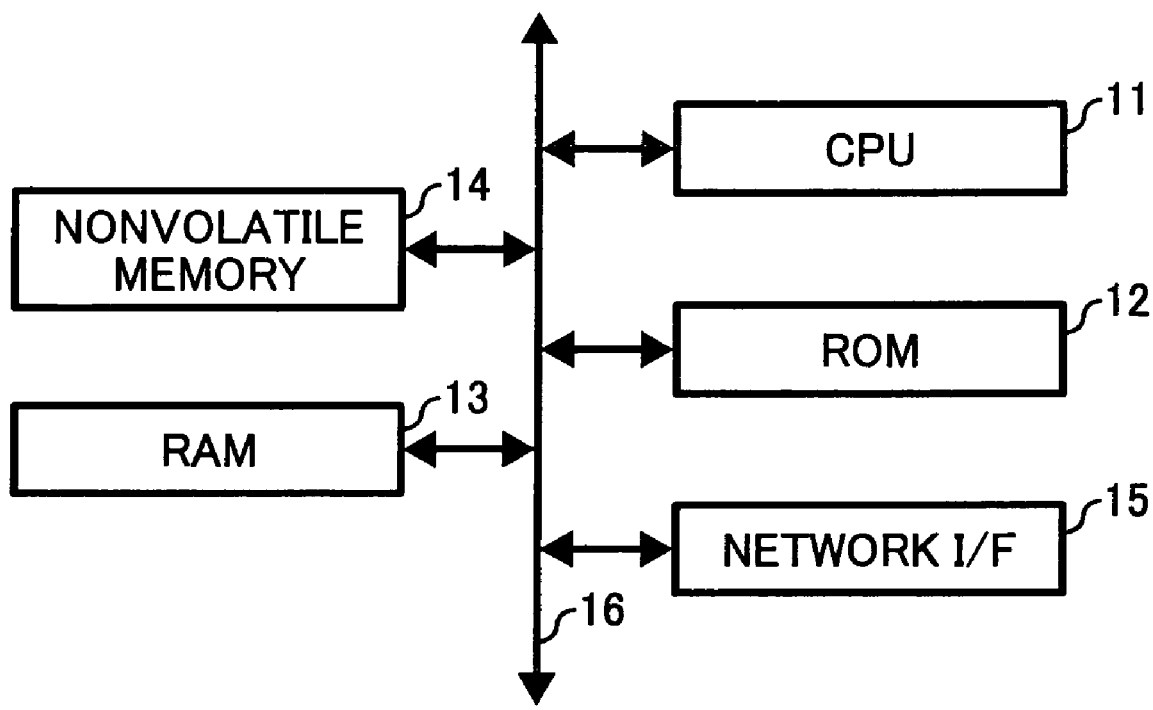
FIG. 5 is a diagram illustrating a hardware configuration of a server and an external apparatus shown in FIG. 1.

Each of the server 101 and the external apparatus 201 includes a hardware configuration shown in FIG. 5. The hardware configuration shown in FIG. 5 is a simplified example, and may vary according to services to be provided and received, functions to be performed through the services, and other functions.

As shown in FIG. 5, each of the server 101 and the external apparatus 201 includes a CPU 11, a ROM 12, a RAM 13, a nonvolatile memory 14, and a network interface (I/F) 15, which are connected with each other through a system bus 16.

In detail, the CPU 11 includes a control mechanism configured to comprehensively control one of the entire server 101 and the entire external apparatus 201 by using a control program stored in one of the ROM 12 and the nonvolatile memory 14. The ROM 12 serves as a memory storing various fixed data including the control program used by the CPU 11. The RAM 13 serves as a temporary memory. The CPU 11 uses the RAM 13 as a working memory when processing data. The nonvolatile memory 14 stores data, and keeps storing data even when the apparatus connected thereto is turned off. The nonvolatile memory 14 includes, for example, a secure digital (SD) card. A program for performing the function described above referring to FIGS. 3 and 4 may be stored as an additional program in the nonvolatile memory 14. The network I/F 15 includes a communication mechanism needed for transmission of information via various networks including the Internet 100 and the LAN 105, and may include, for example, a network interface card (NIC).

Figure 6:
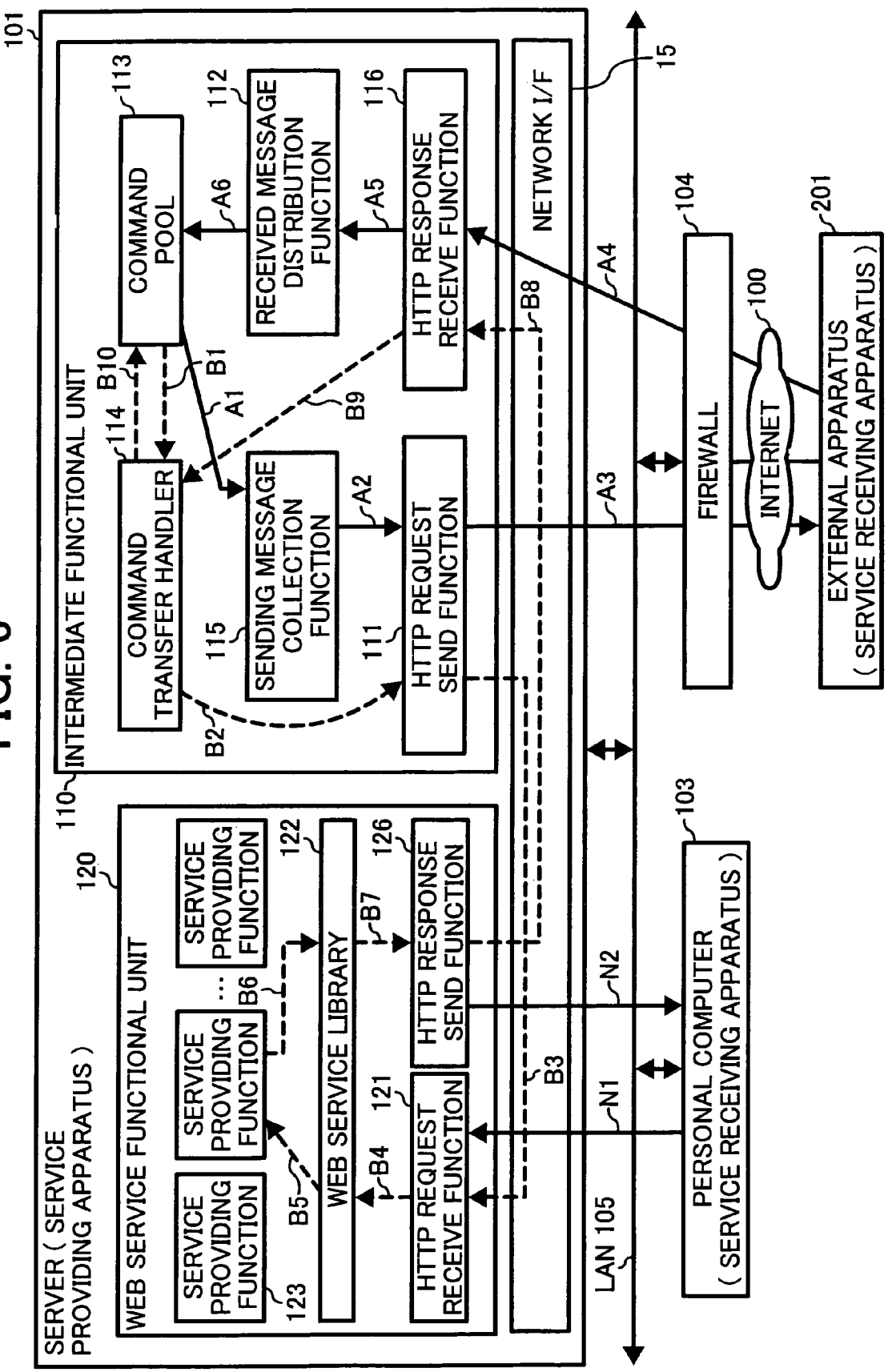
FIG. 6 is a functional block diagram illustrating a configuration of functions for transferring a command and a response, and for providing a service among functions of the server shown in FIG. 1.

The server 101 includes functional parts for sending and receiving a command and a response, and for performing processing related to service provision as shown in FIG. 6. The CPU 11 performs functions shown in FIG. 6 by executing the control program to control operations of the functional parts of the server 101.

As shown in FIG. 6, the server 101 includes an intermediate functional unit 110 and a web service functional unit 120. The intermediate functional unit 110 includes a function related to transfer of a command and a response to and from the external apparatus 201. The function of the intermediate function unit 110 is added to the server 101 including a function of the web service functional unit 120 by an intermediate module. The intermediate module may be provided in a form of one of software and hardware. The function of the web service functional unit 120 is related to provision of a service. When serving alone, the web service functional unit 120 directly receives a command and sends back a response.

The intermediate functional unit 110 includes an HTTP request send function 111, a received message distribution function 112, a command pool 113, a command transfer handler 114, a sending message collection function 115, and an HTTP response receive function 116. The web service functional unit 120 includes an HTTP request receive function 121, a web service library 122, a plurality of service providing functions 123, and an HTTP response send function 126.

The command pool 113 is provided in a re-writable memory such as the nonvolatile memory 14. The command pool 113 may be provided in one of the RAM 13 and a hard disk drive (not shown). The received message distribution function 112, the command transfer handler 114, and the sending message collection function 115 are performed by the CPU 11. The HTTP request send function 111 and the HTTP response receive function 116 are performed by the CPU 11 and the network I/F 15.

The above functions are described in detail below.

The HTTP request send function 111 obtains a sending message generated by the sending message collection function 115 (shown by an arrow A2), generates an HTTP request so as to incorporate the sending message, and sends the HTTP request to the external apparatus 201 (shown by an arrow A3). The HTTP request send function 111 also obtains a sending message from the command transfer handler 114 (shown by an arrow B2), in other words, various SOAP requests to be transferred to the web service functional unit 120, and generates an HTTP request so as to incorporate the various SOAP requests, and sends the HTTP request to the web service functional unit 120 (shown by an arrow B3).

The HTTP response receive function 116 receives an HTTP response sent from the external apparatus 201 (shown by an arrow A4), and transfers the HTTP response to the received message distribution function 112 (shown by an arrow A5). The HTTP response receive function 116 also receives an HTTP response sent from the web service functional unit 120 (shown by an arrow B8), and transfers the HTTP response to the command transfer handler 114 (shown by an arrow B9). The HTTP responses can be discriminated by senders thereof.

The received message distribution function 112 serves as a distribution mechanism. The received message distribution function 112 obtains data included in the HTTP response received by the HTTP response receive function 116 (shown by the arrow A5), prepares a command sheet in the command pool 113, and registers the data into the command sheet (shown by an arrow A6). The command pool 113 represents a pool for registering a command received from the external apparatus 201 in association with a response to the command, and with identification information of the command.

The command transfer handler 114 reads a command to be transferred to the web service functional unit 120 out of the command pool 113 in association with a command ID and a method name (shown by an arrow B1), generates a sending message with the command, the command ID, and the method name, and transfers the sending message to the HTTP request send function 111 (shown by the arrow B2). When transfer priorities are assigned to commands, the command transfer handler 114 may be configured to read out the commands in the order of descending priorities.

A sending message refers a SOAP message including a command and a command ID written in an extensible markup language (XML) of a structured language. The command transfer handler 114 generates one SOAP message representing one sending message for one command. A SOAP message is called a SOAP envelope, and includes a SOAP header and a SOAP body. The SOAP header includes a command ID of a command, while the SOAP body includes contents of the command. In communication using the SOAP, a SOAP message written in the XML is exchanged by using a protocol such as the HTTP. Such a SOAP message can be generated from a command by executing a required conversion program (serializer) generated in a web service description language (WSDL) to serialize data. The serializer is not necessary for a part of data in the command sheet which is registered in the XML.

The command transfer handler 114 also receives a response from the web service functional unit 120 via the HTTP response receive function 116 (shown by the arrow B9), and registers the response into an appropriate command sheet stored in the command pool (shown by an arrow B10). The response is included in an HTTP response received from the web service functional unit 120, and is registered as an output parameter of a corresponding command. A command ID associated with the command can be identified by collating with command IDs registered in command sheets stored in the command pool 113. In the process, a received message (SOAP message) included in the HTTP response is extracted, and extracted data is converted into a format needed for the registration into a table. The conversion can be performed by executing a required conversion program (deserializer) generated in the WSDL. In the embodiment of the present invention, as the response can be transferred to the external apparatus 201 as it is, an XML character string can be directly registered as an output parameter. Therefore, the conversion using the deserializer can be omitted.

The sending message collection function 115 serves as a collection mechanism. The sending message collection function 115 reads a response to be sent to the external apparatus 201 out of the command pool 113 in association with a command ID (shown by an arrow A1), and generates a sending message with the response and the command ID. The sending message collection function 115 also transfers the generated sending message to the HTTP request send function 111 (shown by the arrow A2). When transfer priorities are assigned to responses, the sending message collection function 115 may be configured to read out the responses in the order of descending priorities.

When the HTTP request send function 111 generates an HTTP request so as to incorporate the sending message generated by the sending message collection function 115, and sends the HTTP request to the external apparatus 201, the HTTP request may include any number of sending messages. Further, the any number of sending messages may include sending messages of responses to such commands that have been transferred to different URLs. In the embodiment of the present invention, the HTTP request send function 111 is configured to put all sending messages generated by the sending message collection function 115 into one HTTP request regardless of types of commands corresponding to responses. Alternatively, an upper limit of the number of sending messages to be included in one HTTP request may be set.

In the embodiment of the present invention, the HTTP request send function 111 is also configured to send an HTTP request each time the sending message collection function 115 tries to read out a response, even when there is no data to be read, and as a result, the sending message collection function 115 generates no SOAP message to be sent. Further, the sending message collection function 115 is configured to regularly try to read out a response, because, as described above, the external apparatus 201 cannot send information to the server 101 unless the server 101 requests communication to the external apparatus 201. For example, the sending message collection function 115 tries to read out a response every 60 minutes. As a result, since the server 101 regularly sends a communication request to the external apparatus 201 even when the server 101 has no data to send, the external apparatus 201 is provided with an opportunity to send information to the server 101, thereby preventing information needed to be transferred from abiding in the external apparatus 201 for a ling time.

In addition to the regularly reading, the sending message collection function 115 may read out a response out of the command pool 113 as necessary so that the HTTP request send function 111 sends an HTTP request to the external apparatus 201. For example, the command transfer handler 114 may be configured to notify the sending message collection function 115 when information needed to be urgently transferred is registered into the command pool 113 so at to cause the sending message collection function 115 to read a response out of the command pool 113.

As described above, the intermediate functional unit 110 causes the external apparatus 201 and the server 101 to collectively transfer to each other a plurality of commands (responses) related to operations of the web service functional unit 120.

Next, the functions of the web service functional unit 120 are described in detail below.

Functions of the HTTP request receive function 121 and the HTTP response send function 126 are performed by the CPU 11 and the network I/F 15. Functions of the web service library 122 and the service providing functions 123 are performed by the CPU 11.

The HTTP request receive function 121 receives an HTTP request sent by the HTTP request send function 111 (shown by the arrow B3), and transfers the HTTP request to the web service library 122 (shown by an arrow B4). The HTTP request receive function 121 also receives an HTTP request sent by other apparatuses, and transfers the HTTP request to the web service library 122.

The web service library 122 obtains URL information to which an HTTP request is to be sent (shown by the arrow B4), and transfers a SOAP request to one of the service providing functions 123 which needs to execute a command included in the SOAP request according to a port number and a URL path included in the URL information (shown by an arrow B5). Alternatively, the web service library 122 may include a function of analyzing contents of a SOAP request, and converting the SOAP request to data in such a format that the service providing functions 123 can recognize.

The web service library 122 also receives a SOAP response of a result of command execution sent from the service providing functions 123 (shown by an arrow B6), and transfers the SOAP response to the HTTP response send function 126 (shown by an arrow B7) so that the HTTP response send function 126 sends back the SOAP response as a response to the command to an apparatus which has sent a corresponding HTTP request. Alternatively, the web service library 122 may include a function of receiving data from the service providing functions 123, and generating a SOAP response according to the data.

Each of the plurality of service providing functions 123 corresponds to a function called by the RPC. One of the service providing functions 123 receives a SOAP request from the web service library 122 (shown by the arrow B5), analyzes contents of the SOAP request to obtain a command, executes an operation designated by the command to generates a result of the execution, and generates a SOAP response with the result to send back to the web service library 122 (shown by the arrow B6). In the case the web service library 122 alternatively includes the function of analyzing a SOAP request as described above, the service providing functions 123 needs not to include the function.

Each of the service providing functions 123 is provided for addressing one of one command and a plurality of commands, and executes an operation designated by each of the commands. The service providing function 123 may include a function of causing one of other service providing functions 123 and other apparatuses to execute the operation designated by each of the commands. The service providing function 123 may by configured to obtain information of where to send an HTTP request including a SOAP request, and to send back different operation results according to a port number and a URL path which has received the HTTP request even for the same command.

The HTTP response send function 126 receives a SOAP response from the web service library 122 (shown by the arrow B7), generates an HTTP response so as to incorporate the SOAP response, and sends the HTTP response to a corresponding sender (shown by the arrow B8). In other words, the HTTP response send function 126 sends a response to a command transferred from the intermediate functional unit 110 to the intermediate functional unit 110, and sends a response to a command which the web service functional unit 120 has directly received from one of other apparatuses to the apparatus.

As described above, with the web service functional unit 120, a service can be provided by receiving a command included in an HTTP request, and sending back an HTTP response including a response being a execution result of an operation designated by the command. Both in the case the command is issued by such a sender that is installed outside the firewall 104, such as the external apparatus 201, and is transferred by the intermediate functional unit 110, and in the case the command is issued by such a sender that is installed inside the firewall 104, such as the personal computer 103, the service can be provided in the same manner as described above.

Further, in the embodiment of the present invention, an HTTP request including a command is received only by one of a predetermined port and a URL path. Therefore, when a command is addressed to one of a port and a URL path other than the predetermined port and URL path, the web service library 122 can recognize that the command is wrong and raise an error, and can easily determine an HTTP request sent for a purpose of other than use of a web service, resulting in improved efficiency in operation.

Further, in the embodiment of the present invention, commands are grouped according to a predetermined unit of functions such as user administration and document administration, and one of a port and a URL path is configured to receive commands grouped in one of the units. In other words, the web service functional unit 120 includes a service mechanism for each of the units. Therefore, the service providing functions 123 can be added with another service providing function and a configuration of the service providing functions 123 can be changed without making a significant change in a distribution rule of the web service library 122 for distributing commands to relevant service providing functions 123.

The command sheet in the server 101 mentioned above has a data structure as shown as an example in FIG. 7.

As shown in FIG. 7, the command sheet of the server 101 includes an area for storing data items including "Command ID", "Method name", "Input parameter", "Status", "Output parameter", and "Command destination". Among the data items, "Command ID", "Method name", and "Input parameter" represent a command (and a command ID assigned to the command), and "Status" and "Command destination" represent administration information. "Output parameter" represents contents of a response generated by the service providing function 123 of the web service functional unit 120 according to a command. The data items of the command sheet may include "Property" of a command sheet.

Contents of each of the data items are described below.

"Method name" includes a type of a function (method) to be called by the web service functional unit 120, and indicates contents of a request to the server 101. "Input parameter" includes one of a whole SOAP envelope and a SOAP body of a command to be transferred to the web service functional unit 120, which is written in the XML and registered as an XML character string. The XML character string is registered as it is because the intermediate functional unit 110 does not execute the command, and, therefore, needs not to analyze the details thereof. "Command ID" includes identification information for identifying a command. "Status" includes data indicating a status of a command operation, which shifts as follows:

"To be processed"→"Completed"→"Responded" Alternatively, the status shifts as follows:

"To be processed"→"In process"→"Completed"→"Responded"

"Output parameter" includes contents of a response to the command, which is stored when the response is received. In the embodiment of the present invention, a whole SOAP envelope related to a SOAP response is stored as an XML character string. "Output parameter" includes no data until the response is received from the web service functional unit 120. Although "Command destination" is designed to include reference information to a module for handling a command included in a command sheet, "Command destination" can be omitted includes in the embodiment of the present invention since all commands registered in the command pool 113 are transferred to the web service functional unit 120 by the command transfer handler 114, and, therefore, reference information to the command transfer handler 114 is always included as "Command destination" in all command sheets.

The server 101 having the above functions sends an HTTP request to the external apparatus 201 as shown by an example in FIG. 8.

As shown in FIG. 8, the HTTP request includes an HTTP body having a plurality of message parts according to a multipurpose internet mail extension (MIME) standard. Each of the plurality of parts includes an entity header and an embedded SOAP envelope (of which detail is not shown). In the example, the HTTP body includes a first part, a second part, a third part, and a fourth part, which are independent and are divided by "MIME_boundary". The number of parts an HTTP request can include is not limited to four. An HTTP request may include any number of parts including zero. The SOAP envelope transferred as being embedded in the HTTP request includes a SOAP response representing a response to a command received from the external apparatus 201 and transferred to the web service functional unit 120.

The server 101 having the above functions receives an HTTP response from the external apparatus 201 as shown by an example in FIG. 9.

As shown in FIG. 9, the HTTP response has the same format as the HTTP request shown in FIG. 8 except for an HTTP header, and of which HTTP body includes a plurality of message parts according to the MIME each including a SOAP envelope (of which detail is not shown). The HTTP response is different from the HTTP request shown in FIG. 8 in that the SOAP envelope embedded in the HTTP response includes a SOAP request for execution of a command sent from the external apparatus 201.

Each of an HTTP request and an HTTP response having the above format is a transferable message, and can be generated by merging a plurality of SOAP envelopes of respective parts without changing formats thereof. Alternatively, such an HTTP request and such an HTTP response can be divided into separate SOAP envelopes of respective parts, and a plurality of HTTP requests and a plurality of HTTP responses including respective SOAP envelopes can be separately transferred.

The above HTTP request and the above HTTP response include parts as shown in FIGS. 10 and 11.

As shown in FIG. 10, a part includes, for example, a command for the web service functional unit 120. The part includes an entity header and a SOAP envelope having a SOAP header and a SOAP body.

A "X-SOAP-Type" header in the entity header includes information representing a type of a SOAP message included in the part. The type is one of a SOAP request and a SOAP response. In the example, the "X-SOAP-Type" header includes a value of "Request" representing that the part is a SOAP request including a SOAP message of a command.

An "Envelope" tag of the SOAP envelope includes attributes for declaring Namespaces. In the example, in addition to standard Namespaces for SOAP, Namespaces specified by URIs of "http://www.example.com/header" and "http://www.example.com/useradmin" are declared. Therefore, it can be understood that an XML tag having a Namespace prefix of "n" represents a tag which belongs to the Namespace specified by the URI of "http://www.example.com/header", and that an XML tag having a Namespace prefix of "nc" represents a tag which belongs to the Namespace specified by the URI of "http://www.example.com/useradmin".

In the SOAP header, contents of an XML tag of "REQUESTED_ID" include "98765". In the communication system according to the embodiment of the present invention shown in FIG. 1, the external apparatus 201 is the only one external apparatus which sends a command to the web service functional unit 120 via the intermediate functional unit 110. Therefore, the web service functional unit 120 knows that all commands received from the intermediate functional unit 110 are sent from the external apparatus 201. Further, when the web service functional unit 120 directly receives a command included in an HTTP request, the web service functional unit 120 knows that a sender of the command is a sender of the HTTP request. Therefore, in the embodiment of the present invention, a SOAP request does not include information of a sender of the command as the information is not needed. In a case there are a plurality of external apparatuses, however, a SOAP header needs to include the information of a sender of a command such as an ID of a sender apparatus.

The SOAP body includes information for specifying a method to be executed by the service providing function 123 of the web service functional unit 120. In the example, the SOAP body includes a "USER_REGISTRATION" tag as the information having subordinate tags "USER_NAME" and "PASSWORD". Elements of the "USER_NAME" and "PASSWORD" tags include parameters to be passed to the specified method. In the example, the "USER_NAME" and "PASSWORD" tags include a name of a user to be registered and a password to be used by the user, respectively.

Next, an example in which a part includes a response to a command is shown in FIG. 11. In the example, the "X-SOAP-Type" header in the entity header includes a value of "Response" representing that the part is a SOAP response including a SOAP message of a response.

In the example, the same Namespaces as the Namespace in FIG. 10 are declared. In the SOAP header, contents of an XML tag of "COMMAND_ID" includes "98765" which is the ID of the relevant command. For the same reason as the reason of the above SOAP request, a SOAP response does not include information of a receiver of the response. Alternatively, the information may be included.

The SOAP body includes a "USER_REGISTRATION Response" tag for indicating that the SOAP response is a response to the "USER_REGISTRATION" command. A subordinate tag of the "USER_REGISTRATION Response" tag includes contents of the response. In the example, the subordinate tag includes information indicating that user registration has been successfully completed.

The server 101 having the above configuration and functions executes steps as shown in FIGS. 12 to 17. Among the steps, steps included in flowcharts shown in FIGS. 12, 14, 16, and 17 are performed by a control program executed by the CPU 11 of the server 101.

Figure 12:
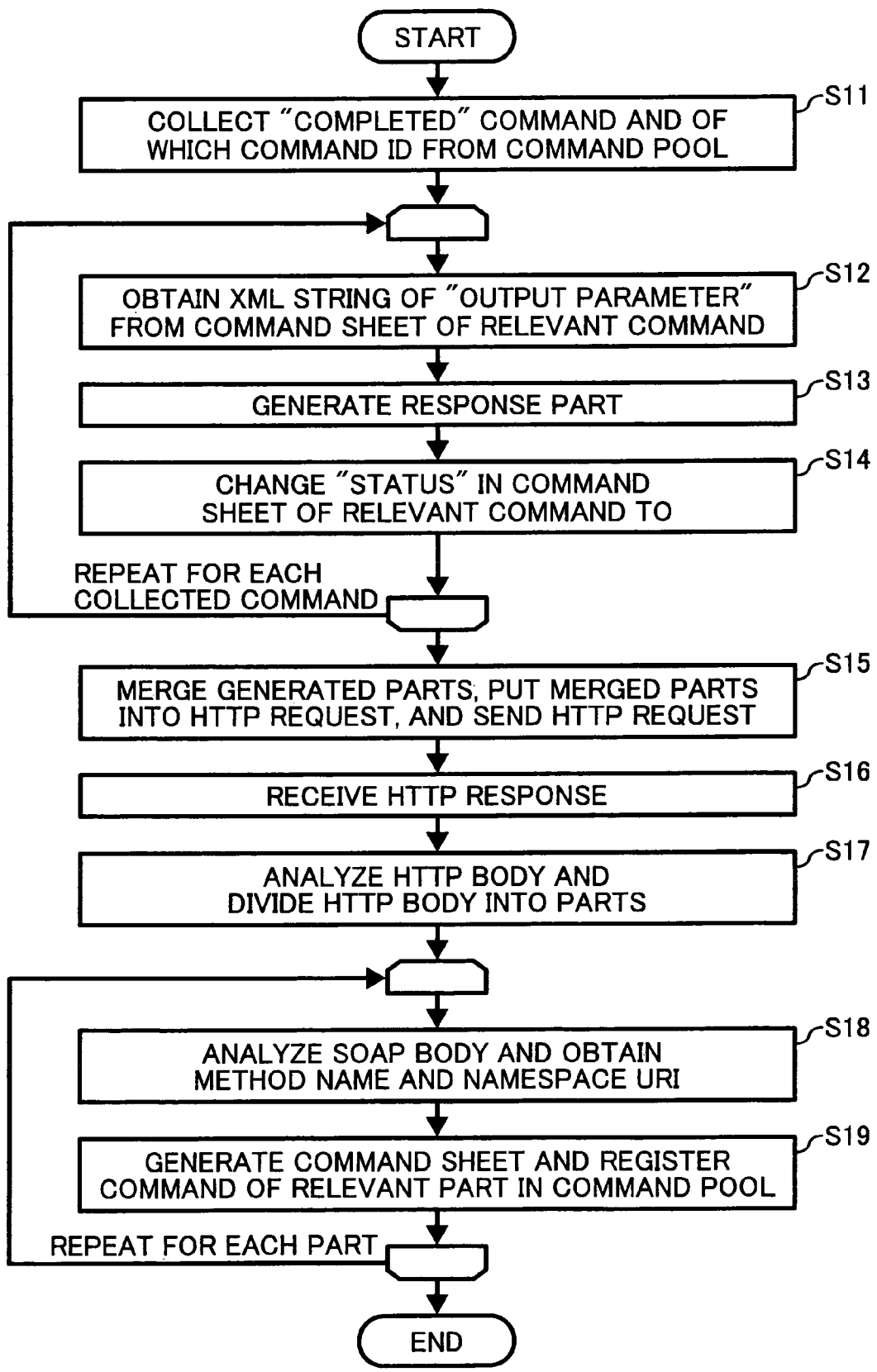
FIG. 12 is a flowchart of a basic operation for collecting and distributing messages in the server.

Basic operations of collection and distribution of messages are performed by the server 101 as shown in the flowchart of FIG. 12.

The CPU 11 of the server 101 starts steps in the flowchart at the time when the sending message collection function 115 tries to read a response out of the command pool 113. In step S11, the CPU 11 collects commands of which "Status" is "Completed" from the command pool 113 as commands to which responses need to be sent to the external apparatus 201. The CPU 11 further collects contents of "Command IDs" thereof as command IDs of the command. The status of "Completion" represents a situation in which although an operation of a command has been executed by the web service functional unit 120, and a response to the command has been registered into a command sheet, the execution and registration has not been informed to the external apparatus 201. Therefore, the CPU can extract command sheets of which contents need to be sent to the external apparatus 201 according to the status.

Then, steps S12 through S14 are repeated to sequentially process all the commands collected in step S11.

In step S12, an XML character string having been registered as "Output parameter" is obtained from a command sheet of the relevant command as contents of a response to be sent to the external apparatus 201. In the embodiment, a SOAP response sent from the web service functional unit 120 to the intermediate functional unit 110 has been registered in a form of a SOAP envelope.

In step S13, a part representing the response to the relevant command is generated by adding an entity header to a SOAP envelope of the XML character string obtained in step S12. In step S14, "Status" of the relevant command in the relevant command sheet is changed to "Responded". The status of "Responded" represents that the response has been sent to the external apparatus 201.

After the above steps are performed for all the commands collected in step S11, the parts generated in step S13 are merged in step S15 so as to generate an HTTP request having the plurality of parts as shown in FIG. 8 and send the HTTP request to the external apparatus 201. In the step, the CPU 11 functions as a collectively sending mechanism.

Alternatively, the change of "Status" performed in step S14 may be performed after the collective sending operation in step S15 is finished. In the case, even when a communication error occurs, the command and the response to be sent are subjected to retry, resulting in improved system reliability.

After the HTTP request is sent in the above steps, the following steps are performed. In step S16, the CPU 11 waits for an HTTP response to the sent HTTP request from the external apparatus 201, and receives the HTTP response. The HTTP response includes a plurality of parts as shown in FIG. 9, and may include any number of parts including zero. In the step, the CPU 11 functions as a collectively receiving mechanism.

After the HTTP response is received in step S16, an HTTP body of the HTTP response is analyzed and is divided into parts in step S17. Then, steps S18 and S19 are repeated to sequentially process all the parts.

In step S18, a SOAP body of the relevant part is analyzed, and a name of a method to be called by a command included in the part and a Namespace URI thereof are obtained. The method name and the Namespace URI related to the command are local names of a Namespace and an element to which a child element of a "Body" element represented by the SOAP body belongs, and are included in a tag of the child elements of the "Body" element. In the example of the SOAP request shown in FIG. 10, the tag is "nc:USER_REGISTRATION". The Namespace prefix of "nc" leads to the Namespace URI defined as the attribute of the "Envelope" tag, which tells that the Namespace URI related to the command is "http://www.example.com/useradmin". Characters following ":" in a Namespace URI directly represent a method name.

In step S19, a command sheet as shown in FIG. 7 is created, and the command included in the relevant part is registered into the command pool 113.

Figures 13, 14:
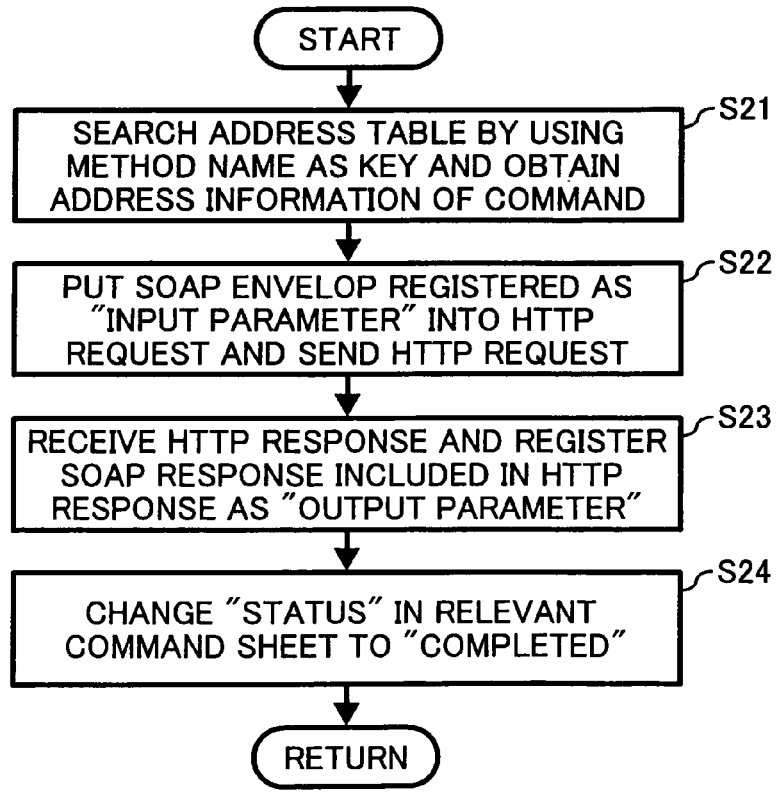

When the command is registered into the command sheet, data items to be written into respective fields of the command sheet are obtained as shown in a table of FIG. 13.

As shown in FIG. 13, "Command ID" is extracted from a SOAP header of a SOAP request. In the example shown in FIG. 10, the command ID is included as an element of the "REQUEST_ID" tag. "Method name" is extracted from a SOAP body. The method name and the Namespace URI obtained in step S19 are registered as "Method name". An XML character string included in a SOAP envelope related to the SOAP request is directly registered as "Input parameter". Data items other than "Command ID" and "Method name" need not to be interpreted. Alternatively, a SOAP body alone may be registered.

An initial value of "To be processed" is registered as "Status". "Command transfer handler 114" is registered as "Command destination". As described above in the explanation of FIG. 7, "Output parameter" initially includes no data. The command registered into the command sheet is transferred to a proper URL of the web service functional unit 120 by the function of the command transfer handler 114 as described below.

When the above steps are completed for all parts obtained through the division in step S17, the procedure in the flowchart of FIG. 12 is finished. In other words, the server 101 has collectively sent to the external apparatus 201 the responses generated by the plurality of service providing functions 123 of the web service functional unit 120. Further, the server 101 has collectively received the commands addressed to the plurality of service providing functions from the external apparatus 201, and is ready to transfer the commands to the proper URL of the web service functional unit 120.

Although all the parts to be sent are generated, merged, and then sent in the embodiment, and all the parts are received, divided into parts, and then processed, the procedures are not limited thereto.

Alternatively, an HTTP header may be first sent, then a part may be sequentially sent each time the part is generated, and a message indicating that all parts have been sent may be finally sent. Even in the case, as long as data sent in the process is dealt as a single logically successive HTTP request having a single HTTP header, the data can be transferred in a single session, requiring negotiation at only one time. And, a result thereof is the same as the result of the procedures in the embodiment. Further, memory capacity needed for buffering data to be sent can be reduced, and as a result, a large volume of data can be handled by a low cost communication apparatus. The alternative sequential processing of parts may be used at a receiving side, and memory capacity needed for buffering data to be received can be similarly reduced.

The command transfer handler 114 transfers a command according to a procedure, for example, as shown in a flowchart of FIG. 14. In the embodiment, the procedure shown in FIG. 14 is performed immediately after step S19 in FIG. 12 is finished, in other words, immediately after a command received from the external apparatus 201 is registered into a command sheet.

In step S21, data registered into a command sheet for a command as "Method name" is obtained, and by using the data as a key for searching the command sheet for information of an URL to which the command is sent (command destination) to obtain the URL information. In the embodiment, the command destination is the web service functional unit 120 which is arranged in the same hardware component as the command transfer handler 114. Therefore, an IP address is a loopback address of "127.0.0.1", and a port number and an URL path are included in a destination table.

Figures 15, 16:
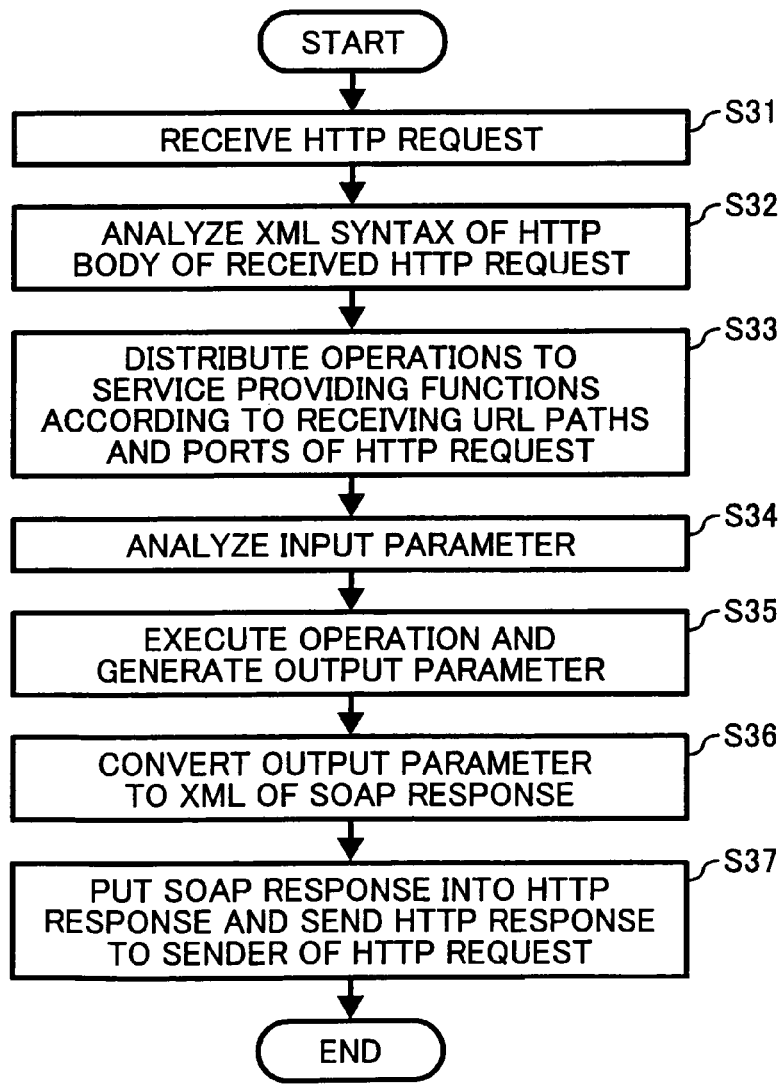
FIG. 15 is an exemplary destination table stored in the server.
FIG. 16 is a flowchart of a command execution operation in the server.

An example of the destination table is shown in FIG. 15. Data items in the destination table includes "Namespace URI", and "Port" (port number) and "URL PATH" of a URL to which a command is to be transferred, which are associated with each other. From the example in FIG. 15, it can be understood that an URL to which a command of which Namespace URI includes "http://www.example.com/useradmin" needs to be transferred is "http://127.0.0.1:80/useradmin". Error handling may be performed when a Namespace URI of a command is not found in the destination table.

In the embodiment, data in the destination table is not grouped by types of commands but by "Namespace URI" since ports and URLs for receiving commands are generally set in functional groups, and commands in one of the functional groups are generally assigned to somewhat common Namespace URIs. Alternatively, the data in the destination table is grouped by command types. In the case, efforts needed for maintenance when a command is one of added and changed can be reduced.

In step S22, an SOAP envelope registered as "Input parameter" in a command sheet is put into an HTTP request, and the HTTP request is sent to the destination obtained in step S21.

In the step, the CPU 11 functions as an individually sending mechanism. Since the destination is inside the same apparatus, the sent HTTP request is received by the server 101 due to a loopback function provided by a function of an operating system. Although FIG. 6 shows that the transfer is carried out through the network I/F 15, when to perform the loopback depends on a configuration and setting of a system. In a case, the loopback may be carried out before data is passed to a physical layer. In another case, the loopback may be carried out by one of a router and a firewall located in a LAN.

The HTTP request received by the server 101 is passed to the web server functional unit 120. After the service providing function 123 processes the command, a response to the command is included in an HTTP response and is sent.

In step S23, the HTTP response is waited to received the HTTP response, which is received by using the loopback function as described above. After the HTTP response is received from the service providing function 123, XML data in a SOAP envelope of a SOAP response included in the HTTP response is registered into a command sheet as "Output parameter".

In step S24, "Status" in the command sheet is changed to "Completed", and the operation goes back to the original procedure in FIG. 12. In step S23, the CPU 11 functions as an individually receiving mechanism.

Through the above procedure, a command received from the external apparatus 201 is transferred to the destination of the service providing function according to information included in the command, and a response received from the service providing function is received, and is stored in association with the command.

The web service functional unit 120 executes a command as shown in a flowchart of FIG. 16.

The web service functional unit 120 executes a command when an HTTP request is sent to the web service functional unit 120. Whether the HTTP request has been sent from the intermediate functional unit 110 in steps S14 through S22 or from other apparatuses such as the personal computer 103 via the LAN 105, the execution of the commands is performed in the same way.

In step S31, an HTTP request is received. In step S32, syntax of XML data of an HTTP body included in the HTTP request is analyzed. In step S33, an operation designated by a SOAP request included in the HTTP request is assigned to proper one of the service providing functions 123. In the step, the proper one is selected by referring to a value of a "SOAPAction" header obtained through the analyses performed in step S32.

In step S34, the selected service providing function 123 analyzes an input parameter included in the SOAP request. In step S35, the operation is executed according to the input parameter, and an output parameter is generated. Alternatively, the analyses of syntax performed in step S23 may be performed in the above procedure.

In step S36, the output parameter is converted to XML data for a SOAP response. In step S37, the XML data is put into an HTTP response to the HTTP request received in step S31, and the HTTP response is sent to a sender of the HTTP request to finish the procedure.

In other words, an operation designated by a command in a SOAP request included in a received HTTP request is executed, and a SOAP response indicating a result of the execution is put into an HTTP response and returned to a sender of the HTTP request.

Figure 17:
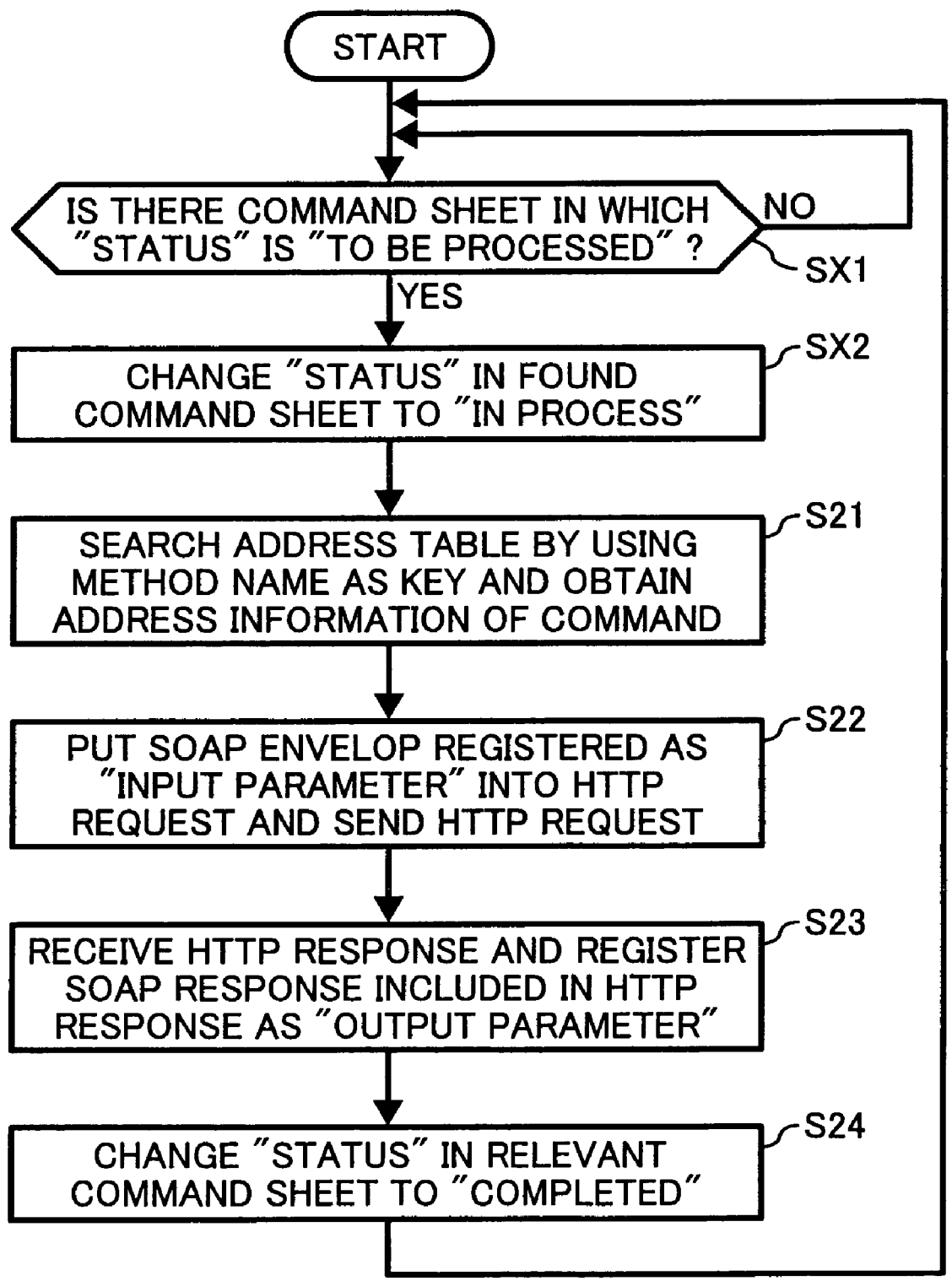
FIG. 17 is a flowchart of another example of the command transfer operation in the server.

As shown in FIG. 17, a command may be transferred independently of the steps shown in FIG. 12. In the case, the CPU 11 starts a procedure shown in a flowchart of FIG. 17 in appropriate timing.

In step SX1, a judgment is made on whether there is a command sheet in which "Status" is "To be processed" in the command pool 113. When the command sheet is not found, waiting is performed until the command sheet is added. When the command sheet is found, "Status" in the command sheet is changed to "In process" in step SX2.

The following steps S21 through S24 are the same as steps S21 through S24 in FIG. 14. After steps S21 through S24 are performed, the above procedure is repeated from step SX1.

The above procedure may be concurrently performed by a plurality of threads (e.g. four threads). Since "Status" of a command sheet in process is not "waiting for processing", the plurality of threads do not redundantly process the same command sheet.

According to the above procedure, since a command can be transferred to the web service functional unit 120 in desired timing, subsequent processing may be smoothly performed even when there is a command of which execution takes long time in the web service functional unit 120. When execution of commands is finished in an order, preparation for sending a result thereof as a response can be made in the order.

In the embodiment of the present invention, since the server 101 includes the above functions, services provided by the plurality of service providing functions 123 of the server 101 installed inside the firewall 104 can be used by the external apparatus 201 installed outside the firewall 104. The above functions are provided by adding the intermediate functional unit 110 to the server 101. Even with the intermediate functional unit 110, the server 101 can receive a command to be executed by the service providing function 123 in the same manner as before the addition, and other apparatuses installed inside the firewall 104 can maintain the same usability of services as before the addition.

The external apparatus 201 also needs to include the intermediate functional unit 110 so that the server 101 and the external apparatus 201 communicate with each other through the intermediate functional unit 110.

A hardware configuration of the external apparatus 201 is the same as the hardware configuration of the server 101 as shown in FIG. 5. A functional configuration of the external apparatus 201 is described below. The same reference numerals used in the following explanation as the reference numerals used above for the explanation of the server 101 represent the same hardware components.

Figures 18, 19:
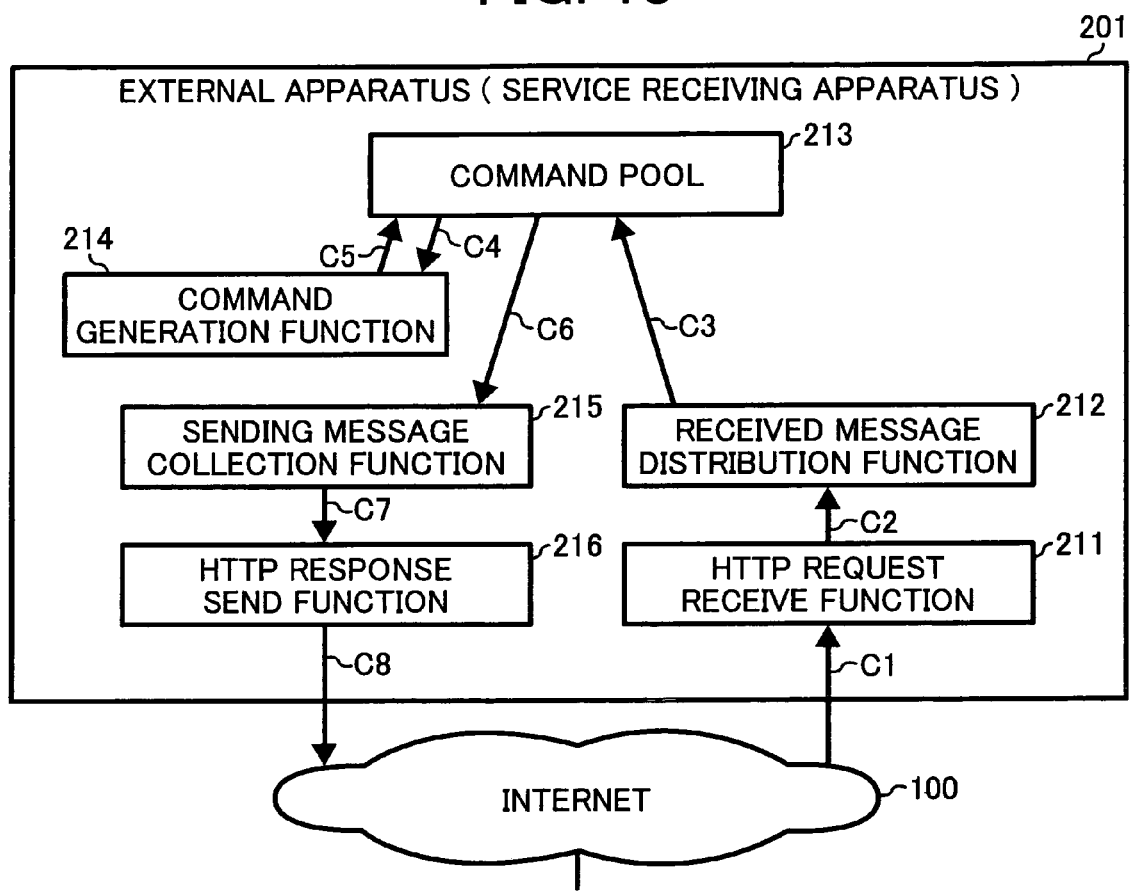
FIG. 18 is a functional block diagram illustrating a configuration of functions for handling a command and a response among the functions of the external apparatus shown in FIG. 1.
FIG. 19 is an illustration of a structure of data included in a command sheet in the external apparatus shown in FIG. 18.

The external apparatus 201 performs functions shown in FIG. 18 to handle a command and a response. As shown in FIG. 18, the external apparatus 201 includes an HTTP request receive function 211, a received message distribution function 212, a command pool 213, a command generation function 214, a sending message collection function 215, and an HTTP response send function 216. The command pool 213 is arranged in a rewritable memory such as the nonvolatile memory 14. Alternatively, the command pool 213 may be arranged in one of the RAM 13 and a hard disk drive (not shown). The received message distribution function 212, the command generation function 214, and the sending message collection function 215 may be performed by the CPU 11. The HTTP request receive function 211 and the HTTP response send function 216 are performed by the CPU 11 and the network I/F 15.

The HTTP request receive function 211 serves as a receive mechanism. The HTTP request receive function 211 receives an HTTP request sent by the server 101 (shown by an arrow C1), and transfer the HTTP request to the received message distribution function 212 (shown by an arrow C2).

The received message distribution function 212 receives the HTTP request from the HTTP request receive function 211 (shown by the arrow C2), and registers data included in the HTTP request into a command sheet in the command sheet 213 (shown by an arrow C3).

The command generation function 214 serves as a request generation mechanism. The command generation function 214 generates a command to be executed by the web service functional unit 120 of the server 101, assigns command identification information (ID) to the command, adds administration information for administering the command, associates the information with each other, and registers the associated information into the command pool 213 as a command sheet in a table format (shown by an arrow C5). Among the above operations of the command generation function 214, the generation of a command is performed by, for example, an application installed in the external apparatus 201. The command generation function 214 may include a function of assigning priorities to generated commands so as to cause the web service functional unit 120 to execute the commands in the order of descending priorities. Further, the command generation function 214 obtains a response to a command when the response is registered into a command sheet in the command pool 213, and performs an operation according to the response (shown by an arrow C4).

The command pool 113 represents a pool into which a command generated by the command generation function 214 and a response received from the server 101 are registered in association with identification information of the commands.

The sending message collection function 215 serves as a collection mechanism. The sending message collection function 215 reads out of the command pool 213 a command generated by the command generation function 214 and a command ID of the command in association with each other, generates a sending message using the commands and the command ID (shown by an arrow of C6), and sends the sending message to the HTTP response send function 216 (shown by an arrow of C7). The sending message has the same format as the sending message generated in the server 101. The sending message collection function 215 may be configured to read out commands in the order of descending priorities when execution priorities are assigned to the commands.

The HTTP response send function 216 serves as a send mechanism. The HTTP response send function 216 receives a sending message from the sending message collection function 215 (shown by the arrow of C7), generates an HTTP response including the sending message, and sends the HTTP response to the server 101 (shown by an arrow of C8). An HTTP response may include any number of sending messages even when URLs to which included commands are to be sent have different ports and different URL paths as long as the sending messages are to be sent to the same sender of the relevant HTTP request. Therefore, in the embodiment of the present invention, the HTTP response send function 216 puts all sending messages generated by the sending message collection function 215 into a single HTTP response regardless of destinations of the sending messages. Alternatively, the number of sending messages to be included in a single HTTP response may be limited.

In the embodiment of the present invention, the HTTP response send function 216 is configured to send an HTTP response each time the sending message collection function 215 tries to read out a command, even when there is no data to be read, and as a result, the sending message collection function 215 generates no SOAP message to be sent. Further, the sending message collection function 215 is configured to regularly try to read out a command, because, as described above, the external apparatus 201 cannot send an HTTP request to the server 101 over the firewall 104 until the server 101 requests communication to the external apparatus 201.

The command sheet in the external apparatus 201 mentioned above has a data structure as shown as an example in FIG. 19.

As shown in FIG. 19, the command sheet in the external apparatus 201 includes substantially the same storage space as the command sheet in the server 101 shown in FIG. 7.

Data items of the command sheet in the external apparatus 201 includes "Command execution result destination" instead of "Command destination" of the command sheet in the server 101. "Command execution result destination" includes reference information to a module to which a notification is sent when a response to a command included in a command sheet is received so as to cause the module to execute a necessary operation. The referenced module may be a module into which a command has been registered, but is not limited thereto.

Data is registered as "Input parameter" and "Output parameter" in such a format that one of a module into which a command has been registered and a module for executing a necessary operation when a response is received can recognize. Therefore, the serializer and the deserializer are used. "Status" includes status data which shifts as follows:

"To be processed"→"Waiting for response"→"Response received"

Other data items are the same as the data items in the command sheet in the server 101 shown in FIG. 7.

Figure 20:
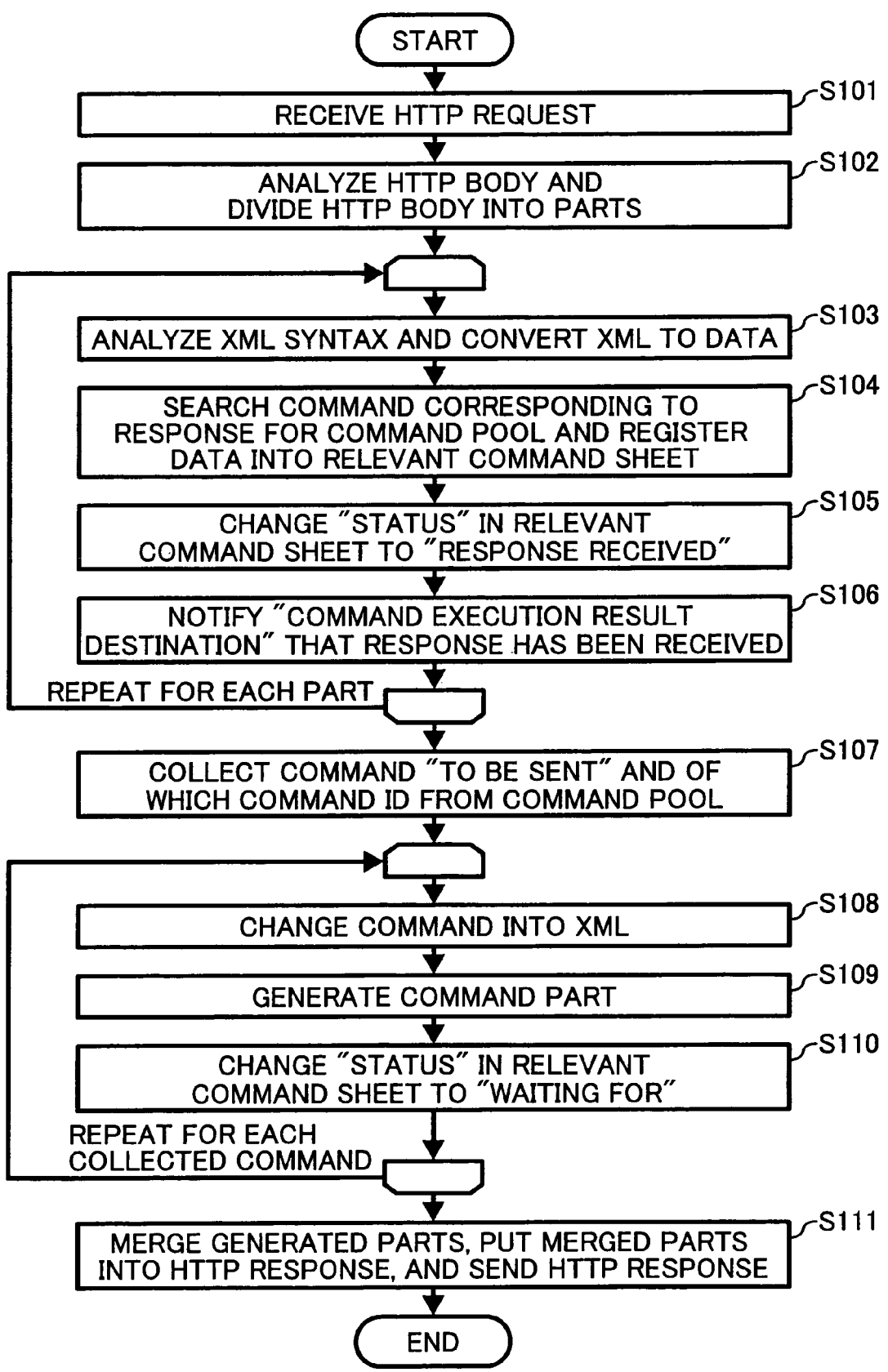
FIG. 20 is a flowchart of a basic operation for collecting and distributing messages in the external apparatus.

Basic operations of collection and distribution of messages are performed by the external apparatus 201 as shown in the flowchart of FIG. 20.

The CPU 11 of the external apparatus 201 starts steps in the flowchart at the time when an HTTP request is sent from the server 101. In step S101, the CPU 11 receives the HTTP request from the server 101. In step S102, the CPU 11 analyzes an HTTP body of the HTTP request and divides the HTTP body into parts. Each of the parts includes a SOAP response of a response to a command sent to the server 101.

Then, steps S103 through S106 are repeated to sequentially process all the parts.

In step S103, the CPU 11 analyzes an XML document in a SOAP envelope of a part, and converts the XML document into data in such a format that can be registered into a command sheet. In step S104, the CPU 11 searches for a command corresponding to a response in the part in the command pool 213, and registers data in the response as "Output parameter" into a command sheet of the command. The response includes as information of "Command ID" the same command ID as the command ID assigned to the command when the command is sent. The CPU 11 searches the command by using the information as a key.

In step S105, the CPU 11 changes "Status" of the command sheet to "Response received". In step S106, the CPU 11 notifies a destination registered as "Command execution result destination" that the response has been received. When being notified, an application which has generated the command recognizes that the response to the command has been returned, and performs an operation according to the response.

For example, when a command for registering a user into the server 101 is generated, and is sent to the server 101, the server 101 returns a response including a result of the user registration. When receiving the response, the external apparatus 201 searches for the command to which the response is returned based on a command ID included in the response, and registers the response in association with the command. Further, the external apparatus 201 notifies an application for handling user registration which is registered as "Command execution result destination" of the command that the response has been received. The application references a related command sheet to obtain the execution result of the command from "Output parameter".

When processing of all the parts is finished after steps S103 through S106 are repeated, subsequent steps are processed to send an HTTP response.

In step S107, the CPU 11 collects from the command pool 213 commands of which "Statuses" are "To be sent" so as to send the commands to the server 101, and also collects "Command IDs" of the commands. In the external apparatus 201, "To be sent" indicates that a command has been generated by the command generation function 214, but the generation has not been notified to the server 101. Therefore, a command of which "Status" is "To be sent" represents a command which needs to be sent to the server 101, and the command can be extracted.

Then, steps S108 through S110 are repeated to sequentially process all the commands collected in step S107.

In step S108, the CPU 11 converts a command and of which command ID to a SOAP body and a SOAP header, respectively, written in XML and included in a SOAP envelope. In step S109, the CPU 11 adds an entity header to the SOAP envelope to generate a part for the command. In step S110, the CPU 11 changes "Status" in a command sheet of the command to "Waiting for a response". "Waiting for a response" indicates that the command has been sent to the server 101.

In step S111, the CPU 111 merges all the parts generated in step S109 into an HTTP response including the plurality of parts as shown in FIG. 9, and sends the HTTP response to the server 101.

Although "Status" is changes in step S110 in the embodiment of the present invention, the change may be done after the HTTP response is actually sent. In the case, the command to be sent is subjected to retry even when a communication error occurs, resulting in improved system reliability.

Further, although all the parts to be sent are generated, merged, and then sent in the embodiment, and all the parts are received, divided into parts, and then processed, the procedures are not limited thereto. Alternatively, a part may be sequentially sent each time the part is generated, and a part may be sequentially processed each time the part is received as described in the above explanation for the server 101.

Another embodiment of the present invention is described below. In the explanation below, only differences from the above embodiment are described.

In the embodiment, the external apparatus 201 recognizes a URL in the server 101 for receiving a command, to which the command is to be transferred, the URL may be included in a part for the command to be sent to the server 101 so that the command transfer handler 114 can transfers the command to the URL.

Examples of the part for the command are shown in FIGS. 21 and 22. As shown in FIGS. 21 and 22, forward URLs may be included, for example, in an entity header of a part and a SOAP header of a SOAP envelope. Alternatively, a forward URL may be included in a SOAP body, however, the forward URL does not represent information of a command, and therefore, it is not preferable to include the forward URL in the SOAP body.

The differences between the embodiment shown in FIGS. 21 and 22 and the above embodiment shown in FIGS. 1 through 20 are shown in table 1. When changes shown in table 1 are made in the above embodiment, the processes in the above embodiment can be used in the embodiment. Further, when a forward URL is included in a part, the server 101 needs not to use the destination table. As a result, setting items required for adding the intermediate functional unit 110 can be reduced, and the intermediate functional unit 110 may be easily added.

TABLE 1

| DRAWINGS | ITEMS TO BE CHANGED | CHANGES |
|---|---|---|
| FIG. 7 | METHOD NAME | METHOD NAME -> FORWARD URL |
| FIG. 12 | S18 | ANALYZE SOAP BODY AND OBTAIN METHOD NAME AND NAMESERVICE PROVIDING APPARATUSCE URI |
| FIG. 13 | METHOD NAME | METHOD NAME -> FORWARD URL EXTRACTED FROM SOAP BODY -> EXTRACTED FROM ONE OF ENTITY HEADER AND SOAP HEADER |
| FIGS. 14 and 17 | S21 | (DELETE) |
| FIGS. 14 and 17 | S22 | SEND HTTP REQUEST TO OBTAINED ADDRESS -> SEND HTTP REQUEST TO ADDRESS REGISTERED AS "FORWARD URL" |

A detailed embodiment of the present invention is described below referring to FIGS. 23 through 34.

Examples of parts for commands and responses to the commands transmitted between the external apparatus 201 and the server 101 are shown in FIGS. 23 through 32.

The example shown in FIG. 23 explains a part for a user deletion command.

The user deletion command belongs to the same command group as the user registration command. Therefore, "SOAPAction" header is the same as "SOAPAction" header of the user registration command shown in FIG. 10 except for a last part of "scratch", which follows "http://www.example.com/useradmin/". The last part is different because types of commands are different. Since Namespace is declared in the same way as the way Namespace is declared for the user registration command, description of attributes of "Envelope" tag is omitted.

In a SOAP header of the example, contents of an XML tag of "REQUEST_ID" include "98766" which is a command ID of the command.

A SOAP body includes a "USER_DELETION" tag as information for specifying a method to be executed by the service providing function 123 of the web service functional unit 120. The SOAP body further includes a user name to be deleted, which is a parameter to be transferred to the method as an element of a subordinate tag "USER_NAME".

The example shown in FIG. 24 explains a part for a response to the user deletion command shown in FIG. 23. Since Namespace is declared in the same way as the way Namespace is declared in FIG. 10, the description of the attributes of "Envelope" tag is omitted.

In a SOAP header of the example, contents of an XML tag of "REQUEST_ID" include "98766" which is a command ID of the command.

A SOAP body includes a "USER_DELETION Response" tag indicating that a response to the user deletion command is included. A subordinate tag of the "USER_DELETION Response" tag includes contents of the response. In the example, the subordinate tag includes information indicating that a user has been successfully deleted.

The examples shown in FIGS. 25 and 26 explain parts for a user list acquisition command, which belongs to the same command group as the user registration command, and a response to the user list acquisition command, respectively.

"SOAPAction" header in the example of the part for the command is the same as "SOAPAction" header of the user registration command shown in FIG. 10 except for a last part of "getuserlist", which follows "http://www.example.com/useradmin/". In a SOAP header, contents of an XML tag of "REQUEST_ID" include "98767". A SOAP body includes a "USER_LIST_ACQUISITION" tag without any parameter indicating that the user list acquisition command is included.

A SOAP body in the example of the part for the response includes a "USER_LIST_ACQUISITION Response" tag indicating that a response to the user list acquisition command is included. A subordinate tag of the "USER_LIST_ACQUISITION Response" tag includes information of a user list as contents of the response.

The examples shown in FIGS. 27 and 28 explain parts for a document list acquisition command, which belongs to a different command group from the user registration command, and a response to the document list acquisition command, respectively.

"SOAPAction" header in the example of the part for the command is different from "SOAPAction" header of the user registration command shown in FIG. 10 since the command groups are different, although a leading part of "http://www.example.com/" is the same. The difference is that "docadmin/getdocumentlist" follows the leading part.

Namespace for the Namespace prefix "nc" is declared differently from the way Namespace is declared for the user registration command. In the examples in FIGS. 27 and 28, Namespace is declared in the same way.

In a SOAP header, contents of an XML tag of "REQUEST_ID" include "98768". A SOAP body includes a "DOCUMENT_LIST_ACQUISITION" tag without any parameter indicating that the document list acquisition command is included.

A SOAP body in the example of the part for the response includes a "DOCUMENT_LIST_ACQUISITION Response" tag indicating that a response to the document list acquisition command is included. A subordinate tag of the "DOCUMENT_LIST_ACQUISITION Response" tag includes information of a document list as contents of the response.

The examples shown in FIGS. 29 and 30 explain parts for a document image acquisition command, which belongs to the same command group as the document list acquisition command, and a response to the document image acquisition command, respectively.

"SOAPAction" header in the example of the part for the command is the same as "SOAPAction" header of the document list acquisition command shown in FIG. 27 except for a last part of "getimagedata", which follows "http://www.example.com/docadmin". Since Namespace is declared in the same way as the way Namespace is declared in FIG. 27, the description of the attributes of "Envelope" tag is omitted.

In a SOAP header, contents of an XML tag of "REQUEST_ID" include "98769". A SOAP body includes a "DOCUMENT_IMAGE_ACQUISITION" tag indicating that a document image acquisition method is called. The SOAP body further includes an ID of a document of which image is to be acquired, which is a parameter to be transferred to the method as an element of a subordinate tag "DOCUMENT_ID". The ID may be selected from, for example, the document list obtained by the document list acquisition command.

The SOAP body of the part for the response includes a "DOCUMENT_IMAGE_ACQUISITION Response" tag indicating that a response to the document image acquisition command is included. A subordinate tag of the "DOCUMENT_IMAGE_ACQUISITION Response" tag includes information of document image data in a binary format as contents of the response.

The examples shown in FIGS. 31 and 32 explain parts for a document deletion command, which belongs to the same command group as the document list acquisition command, and a response to the document deletion command, respectively.

"SOAPAction" header in the example of the part for the command is the same as "SOAPAction" header of the document list acquisition command shown in FIG. 27 except for a last part of "delete", which follows "http://www.example.com/docadmin". Since Namespace is declared in the same way as the way Namespace is declared in FIG. 27, the description of the attributes of "Envelope" tag is omitted.

In a SOAP header, contents of an XML tag of "REQUEST_ID" include "98770". A SOAP body includes a "DOCUMENT_DELETION" tag indicating that a document deletion method is called. The SOAP body further includes an ID of a document to be deleted, which is a parameter to be transferred to the method as an element of a subordinate tag "DOCUMENT_ID". The ID may be selected from, for example, the document list obtained by the document list acquisition command.

The SOAP body of the part for the response includes a "DOCUMENT_DELETION Response" tag indicating that a response to the document deletion command is included. A subordinate tag of the "DOCUMENT_DELETION Response" tag includes information indicating that the document has been successfully deleted as contents of the response.

The above embodiments using the command group related to user administration described referring to FIGS. 10, 11, and 23 through 26 may be applied to an example shown in FIG. 33.

As shown in a part (a) of FIG. 33, when one of a digital multifunction apparatus and a printer installed inside a LAN includes a function of providing a service related to user administration, an administrator operates an administrator's terminal connected to the LAN to send a command such as a user administration command and a user deletion command to each apparatus so as to administer a user using the apparatus. When the service related to user administration cannot be used from an apparatus installed outside a firewall, the administration needs to be done inside the firewall.

As shown in a part (b) of FIG. 33, when the intermediate functional unit 110 as shown in FIG. 6 is added to apparatuses subjected to administration, the service related to user administration can be used from each apparatus installed outside the firewall. In the case, for example, when administration of users of apparatuses in a user environment is outsourced to an administration service provider, total cost of ownership may be reduced.

The above embodiments using the command group related to document management described referring to FIGS. 27 through 33 may be applied to an example shown in FIG. 34.

As shown in a part (a) of FIG. 34, when a digital multifunction apparatus installed inside a LAN includes a function of providing a service related to document management, a scanned image is stored as a document in a document box so that a user can retrieve the document into a document management server and a user terminal to make a backup, and can print out the document or save the document into a medium to take out of the LAN. When the service related to document management cannot be used from an apparatus installed outside a firewall, the document needs to be printed and backuped inside a user environment (for example, an office).

As shown in a part (b) of FIG. 34, when the intermediate functional unit 110 as shown in FIG. 6 is added to the digital multifunction apparatus, the service related to document management can be used from each apparatus installed outside the firewall. In the case, for example, management of documents scanned by using the digital multifunction apparatus can be outsourced to an administration service provider so that the administration service provider can regularly retrieve the documents from the digital multifunction apparatus, and can store and manage the document. In the case, a user can obtain data of any of the documents by accessing an administration service provider's terminal from a user terminal, and the user can print out any of the documents by accessing the document data from a copier installed in a convenience store. Further, the user can use the documents for business by accessing the document data from a terminal of an external small office home office (SOHO). As a result, users of widespread apparatuses can have access to documents read out in a user environment while maintaining security with relatively small efforts.

Other applications of the above embodiments are described below.

Although, in the above embodiments, the SOAP is adopted as an upper level protocol for using the RPC, and the application directly operates the command pool to use the RPC, a bridge (a message conversion function) may be implemented between the application and one of a common object request broker architecture (CORBA) and a JAVA® remote method invocation (RMI) so that efficiency of developing the application can be improved. In other words, although, in the above embodiments, commands and responses to the commands are transmitted between nodes by using SOAP messages written in XML, the format is not limited thereto.

An amount of information included in a command and a response to the command may be limited. Especially, when the amount of information included in a command is limited, an amount of memory to be used by a receiving apparatus with limited memory capacity can be limited.

Further, although, in the above embodiments, in addition to the SOAP standard protocol, the unique protocol combining the SOAP and the plurality of MIME parts is used to independently handle SOAP envelopes included in an HTTP request or response, a SOAP attachment defined as a SOAP related specification may be used. In the case, a link to SOAP envelopes of a second part and thereafter may be embedded in a SOAP envelope of a first part included in an HTTP response in association with each other. The SOAP attachment may also be applied to a case the SMTP is used for an E-mail message.

Further, although, in the above embodiments, the HTTP is used as a data communication protocol located below the upper level protocol such as the SOAP, other protocols such as a file transfer protocol (FTP) and the SMTP may be used.

Further, although, in the above embodiments, the server 101 and the external protocol 210 are connected with each other through the Internet 100, other communication channels for network communication, wired or not, may be used. A communication channel other than the LAN may be used for a connection between apparatuses in the user environment.

The configuration of the communication system described above is not limited thereto. For example, the service providing apparatus may be installed outside the firewall, and the plurality of service receiving apparatuses may be installed.

The service providing apparatus and the service receiving apparatus are not limited to the general-purpose computer terminal. A printer, a facsimile machine, a digital copier apparatus, a scanner, an image forming apparatus such as a digital multifunction apparatus, a network appliance, a vending machine, a medical equipment, a power supply unit, an air conditioning system, a measurement system for gas, water, electricity, and so forth, a vehicle, an air craft, and so forth equipped with a communication function, and a communication device such as a cellular phone may be used instead.

The program according to the embodiment of the present invention may be provided as a program product stored in a storage mechanism such as a ROM and a HDD mounted to a computer. Alternatively, the program product may be provided as a recording medium such as a CD-ROM, and a non-volatile memory medium such as a flexible disk, a SRAM, an EEPROM, and a memory card. The program stored in the medium is installed to a computer to cause a CPU to execute the program to add the above functions. Alternatively, the program stored in the medium is read by the CPU so that the CPU can execute the program to add the above functions. Further, the program can be stored in one of a recording medium included in external equipment and a recording mechanism of the external equipment so that the program is downloaded and executed.

A module for performing the functions of the intermediate function unit may be added by installing the program one of from a CD-ROM and through the Internet. Alternatively, the module may be added by installing the program by reading out of one of a PC card and a SD card. Alternatively, a board including the functions of the intermediate functional unit may be added to an apparatus. In the case, when necessary, contents of the destination table shown in FIG. 15 may be set. The setting may be performed by manually entering the contents from a keyboard. Alternatively, the setting may be made by using a WSDL file included in the web service library 122 to specify a URL for sending a command.

A length of an interval between communication requests to the external apparatus 201 may be determined and registered as necessary. Further, a URL of an external apparatus to which a communication request is send may be registered as necessary. Alternatively, the length and the URL may be automatically set when the program is installed.

This patent specification is based on a Japanese patent application, No. JP2005-112779 filed on Apr. 8, 2005 in the Japan Patent Office, the entire contents of which are incorporated by reference herein.

What is claimed as new and desired to be secured by letterservice providing apparatustent of the United States is:

1. A communication system, comprising:
a first communication apparatus installed outside a firewall;
a second communication apparatus installed inside the firewall and configured to communicate with the first communication apparatus via the firewall provided between the first communication apparatus and the second communication apparatus,
wherein the second communication apparatus includes:
a service functional unit including a plurality of service providing functions each providing a service to an apparatus installed inside the firewall; and an intermediate mechanism configured to intermediate communication between the service functional unit and the first communication apparatus installed outside the firewall, wherein the intermediate mechanism includes:

a collectively receiving mechanism configured to collectively receive a plurality of operation requests sent from the first communication apparatus via the firewall, the plurality of operation requests respectively addressed to the plurality of service providing functions of the service functional unit and being included in a single communication response;

a separately sending mechanism configured to separately send the plurality of operation requests included in the single communication response received by the collectively receiving mechanism respectively to the plurality of service providing functions of the service functional unit;

a separately receiving mechanism configured to separately receive from the plurality of service providing functions of the service functional unit a plurality of operation responses each indicating the result of performing the respective one of the plurality of operation requests sent by the separately sending mechanism; and a collectively sending mechanism configured to collectively send the plurality of operation responses received from the separately receiving mechanism to the first communication apparatus installed outside the firewall via the firewall, the plurality of operation responses being included in a single communication request in response to the single communication response, wherein the plurality of operation requests and the plurality of operation responses are respectively formed as a plurality of operation messages each having a predetermined format, and the single communication response including the plurality of operation requests and the single communication request including the plurality of operation responses are each generated by merging at least two of the plurality of operation messages without changing the predetermined format of each operation message, and wherein the intermediate mechanism is configured to initiate communication between the second communication apparatus and the first communication apparatus installed outside the firewall by transmitting an unsolicited communication request from the intermediate mechanism to the first communication apparatus repeatedly at a first time interval, and the first communication apparatus sends the single communication response including the plurality of operation requests in response to the unsolicited communication request.

2. The system of claim 1, wherein the intermediate mechanism further comprises:

a storage mechanism configured to store the plurality of operation requests received by the collectively receiving mechanism and the plurality of operation responses received by the separately receiving mechanism such that each one of the plurality of operation requests is associated with each one of the plurality of operation responses; and a collection mechanism configured to read the plurality of operation responses, one by one, from the storage mechanism and send the read plurality of operation responses to the collectively sending mechanism.

3. The system of claim 2, wherein the second communication apparatus is an image forming apparatus.

4. A communication system comprising:

a first communication apparatus installed outside a firewall;

a second communication apparatus installed inside the firewall and configured to communicate with the first communication apparatus via the firewall provided between the first communication apparatus and the second communication apparatus, the second communication apparatus having a service functional unit including a plurality of service providing functions each providing a service to an apparatus installed inside the firewall; and an intermediate mechanism configured to intermediate communication between the service functional unit and the first communication apparatus installed outside the firewall, wherein the intermediate mechanism includes:

a collectively receiving mechanism configured to collectively receive a plurality of operation requests sent from the first communication apparatus via the firewall, the plurality of operation requests respectively addressed to the plurality of service providing functions of the service functional unit and being included in a single communication response;

a separately sending mechanism configured to separately send the plurality of operation requests included in the single communication response received by the collectively receiving mechanism respectively to the plurality of service providing functions of the service functional unit;

a separately receiving mechanism configured to separately receive from the plurality of service providing functions of the service functional unit a plurality of operation responses each indicating the result of performing the respective one of the plurality of operation requests sent by the separately sending mechanism; and a collectively sending mechanism configured to collectively send the plurality of operation responses received from the separately receiving mechanism to the first communication apparatus installed outside the firewall via the firewall, the plurality of operation responses being included in a single communication request in response to the single communication response, wherein the plurality of operation requests and the plurality of operation responses are respectively formed as a plurality of operation messages each having a predetermined format, and the single communication response including the plurality of operation requests and the single communication request including the plurality of operation responses are each generated by merging at least two of the operation messages without changing the predetermined format of each operation message, and wherein the intermediate mechanism is configured to initiate communication between the second communication apparatus and the first communication apparatus installed outside the firewall by transmitting an unsolicited communication request from the intermediate mechanism to the first communication apparatus repeatedly at a first time interval, and the first communication apparatus sends the single communication response including the plurality of operation requests in response to the unsolicited communication request.

5. The system of claim 4, wherein the intermediate mechanism further comprises:

a storage mechanism configured to store the plurality of operation requests received by the collectively receiving mechanism and the plurality of operation responses received by the separately receiving mechanism such that each one of the plurality of operation requests is associated with each one of the plurality of operation responses; and a collection mechanism configured to read the plurality of operation responses, one by one, from the storage mechanism and send the read plurality of operation responses to the collectively sending mechanism.

6. A communication apparatus installed inside a firewall, comprising:

a service functional unit including a plurality of service providing functions each providing a service to an apparatus installed inside the firewall; and an intermediate mechanism configured to intermediate communication between the service functional unit and an external communication apparatus installed outside the firewall, the intermediate mechanism including:

a collectively receiving mechanism configured to collectively receive a plurality of operation requests sent from the external communication apparatus via the firewall, the plurality of operation requests respectively addressed to the plurality of service providing functions of the service functional unit and being included in a single communication response;

a separately sending mechanism configured to separately send the plurality of operation requests included in the single communication response received by the collectively receiving mechanism respectively to the plurality of service providing functions of the service functional unit;

a separately receiving mechanism configured to separately receive from the plurality of service providing functions of the service functional unit a plurality of operation responses each indicating the result of performing the respective one of the plurality of operation requests sent by the separately sending mechanism; and a collectively sending mechanism configured to collectively send the plurality of operation responses received from the separately receiving mechanism to the external communication apparatus installed outside the firewall via the firewall, the plurality of operation responses being included in a single communication request in response to the single communication response, wherein the plurality of operation requests and the plurality of operation responses are respectively formed as a plurality of operation messages each having a predetermined format, and the single communication response including the plurality of operation requests and the single communication request including the plurality of operation responses are each generated by merging at least two of the plurality of operation messages without changing the predetermined format of each operation message, and wherein the intermediate mechanism is configured to initiate communication between the communication apparatus and the external communication apparatus installed outside the firewall by transmitting an unsolicited communication request from the intermediate mechanism to the external communication apparatus repeatedly at a first time interval, and the external communication apparatus sends the single communication response including the plurality of operation requests in response in response to the unsolicited communication request.

7. The apparatus of claim 6, wherein the intermediate mechanism further comprises:

a storage mechanism configured to store the plurality of operation requests received by the collectively receiving mechanism and the plurality of operation responses received by the separately receiving mechanism such that each one of the plurality of operation requests is associated with each one of the plurality of operation responses; and a collection mechanism configured to read the plurality of operation responses, one by one, from the storage mechanism and send the read plurality of operation responses to the collectively sending mechanism.

8. A non-transitory computer readable medium including a computer program, which when executed by a computer of a communication system including a first communication apparatus installed outside a firewall and a second communication apparatus installed inside the firewall and having a service functional unit including a plurality of service providing functions each providing a service to an apparatus installed inside the firewall, causes the computer to perform a method comprising:

intermediating communication between the service functional unit and the first communication apparatus installed outside the firewall, wherein the intermediating includes:

collectively receiving a plurality of operation requests sent from the first communication apparatus via the firewall, the plurality of operation requests respectively addressed to the plurality of service providing functions of the service functional unit and being included in a single communication response;

separately sending the plurality of operation requests included in the single communication response received by the collectively receiving step respectively to the plurality of service providing functions of the service functional unit;

separately receiving from the plurality of service providing functions of the service functional unit a plurality of operation responses each indicating the result of performing the respective one of the plurality of operation requests sent by the separately sending step; and collectively sending the plurality of operation responses received by the separately receiving step to the first communication apparatus installed outside the firewall via the firewall, the plurality of operation responses being included in a single communication request in response to the single communication response, wherein the plurality of operation requests and the plurality of operation responses are respectively formed as a plurality of operation messages each having a predetermined format, and the single communication response including the plurality of operation requests and the single communication request including the plurality of operation responses are each generated by merging at least two of the plurality of operation messages without changing the predetermined format of each operation message, and wherein the intermediating further includes initiating communication between the second communication apparatus and the first communication apparatus installed outside the firewall by transmitting an unsolicited communication request to the first communication apparatus repeatedly at a first time interval, and sending, from the first communication apparatus, the single communication response including the plurality of operation requests in response to the unsolicited communication request.

9. The non-transitory computer readable medium of claim 8, wherein the plurality of operation requests and the plurality of operation responses are respectively formed as a plurality of simple object access protocol (SOAP) envelopes each having a predetermined format, and the single communication response including the plurality of operation requests and the single communication request including the plurality of operation responses are each generated by merging at least two of the plurality of SOAP envelopes without changing the predetermined format of each SOAP envelope.

10. The system of claim 1, wherein the operation messages are simple object access protocol envelopes.

11. The system of claim 4, wherein the operation messages are simple object access protocol envelopes.

12. The apparatus of claim 6, wherein the operation messages are simple object access protocol envelopes.

13. The non-transitory computer readable medium of claim 8, wherein the operation messages are simple object access protocol envelopes.

* * * * *